(12) United States Patent
Kishi et al.

(10) Patent No.: US 8,094,726 B2
(45) Date of Patent: Jan. 10, 2012

(54) IMAGE ENCODING APPARATUS AND CONTROL METHOD THEREOF

(75) Inventors: Hiroki Kishi, Funabashi (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 12/411,992

(22) Filed: Mar. 26, 2009

(65) Prior Publication Data

US 2009/0252232 A1    Oct. 8, 2009

(30) Foreign Application Priority Data

Apr. 2, 2008    (JP) ................................. 2008-096560

(51) Int. Cl.
*H04N 11/02* (2006.01)
*G06K 9/36* (2006.01)

(52) U.S. Cl. ............. 375/240.24; 382/239; 375/240.18; 375/240.21

(58) Field of Classification Search ....... 375/240.18–19, 375/240.24; 382/244, 232, 236, 248, 250
See application file for complete search history.

(56) References Cited

U.S. PATENT DOCUMENTS

| | | | |
|---|---|---|---|
| 6,549,676 B1 | 4/2003 | Nakayama et al. | 382/246 |
| 6,560,365 B1 | 5/2003 | Nakayama et al. | 382/233 |
| 6,567,562 B1 | 5/2003 | Nakayama et al. | 382/246 |
| 6,600,835 B1 * | 7/2003 | Ishikawa | 382/236 |
| 6,711,295 B2 | 3/2004 | Nakayama et al. | 382/232 |
| 6,768,819 B2 | 7/2004 | Yamazaki et al. | 382/240 |
| 6,847,735 B2 | 1/2005 | Kajiwara et al. | 382/233 |
| 6,879,726 B2 | 4/2005 | Sato et al. | 382/239 |
| 6,879,727 B2 | 4/2005 | Sato et al. | 382/239 |
| 6,917,716 B2 | 7/2005 | Kajiwara et al. | 382/240 |
| 6,947,600 B1 | 9/2005 | Sato et al. | 382/233 |
| 6,950,471 B2 | 9/2005 | Kishi | 375/240.19 |
| 6,993,198 B2 | 1/2006 | Kishi | 382/240 |
| 7,158,669 B2 | 1/2007 | Tanaka et al. | 382/166 |
| 7,305,139 B2 | 12/2007 | Srinivasan et al. | 382/248 |
| 7,428,342 B2 | 9/2008 | Tu et al. | 382/248 |

(Continued)

FOREIGN PATENT DOCUMENTS

JP    2006-197573 A    7/2006

OTHER PUBLICATIONS

Hara, J., "Current report of standardization for the JPEG XR image compression", The Journal of the Institute of Image Electronics Engineers of Japan, vol. 37, No. 4, Jul. 25, 2008, pp. 502-512 (with translation).

(Continued)

*Primary Examiner* — Joseph Ustaris
*Assistant Examiner* — Leron Beck
(74) *Attorney, Agent, or Firm* — Fitzpatrick, Cella, Harper & Scinto

(57) ABSTRACT

This invention enables to generate encoded data without noticeable image quality degradation when reproducing an image at a lower resolution not to mention the original resolution. An image a digital camera can capture takes three sizes L, M, and S. When the size L is designated, stream conversion information SC is set to "2". When the size M is designated, the stream conversion information SC is set to "1". When the size S is designated, the stream conversion information SC is set to "0". When encoding image data in compression processing, block overlap processing of suppressing discontinuity of data at the boundary between adjacent blocks is executed as many times as the count set in the stream conversion information.

8 Claims, 30 Drawing Sheets

U.S. PATENT DOCUMENTS

| | | | |
|---|---|---|---|
| 7,454,075 B2 * | 11/2008 | Fukuhara et al. | 382/240 |
| 7,483,581 B2 * | 1/2009 | Raveendran et al. | 382/236 |
| 7,499,592 B2 | 3/2009 | Nakayama et al. | 382/233 |
| 7,574,063 B2 | 8/2009 | Kajiwara et al. | 382/239 |
| 7,925,097 B2 | 4/2011 | Tarumoto et al. | 382/232 |
| 2007/0127826 A1 | 6/2007 | Kishi | 382/232 |
| 2007/0160299 A1 | 7/2007 | Kajiwara et al. | 382/240 |
| 2007/0286478 A1 | 12/2007 | Kishi | 382/162 |
| 2008/0089413 A1 | 4/2008 | Kishi et al. | 375/240.13 |
| 2008/0317368 A1 | 12/2008 | Tu et al. | 382/248 |
| 2009/0252477 A1 | 10/2009 | Yokota et al. | 386/94 |
| 2010/0034478 A1 | 2/2010 | Kajiwara et al. | 382/248 |
| 2010/0316303 A1 | 12/2010 | Kishi | 382/233 |
| 2010/0316304 A1 | 12/2010 | Kishi | 382/233 |

OTHER PUBLICATIONS

"JPEG XR Leads to 8-Bit Tone Ultra Camera", 2008 Nikkei Electronics, Dec. 29, 2008, pp. 71-77.

* cited by examiner $$\begin{bmatrix} Y \\ U \\ V \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

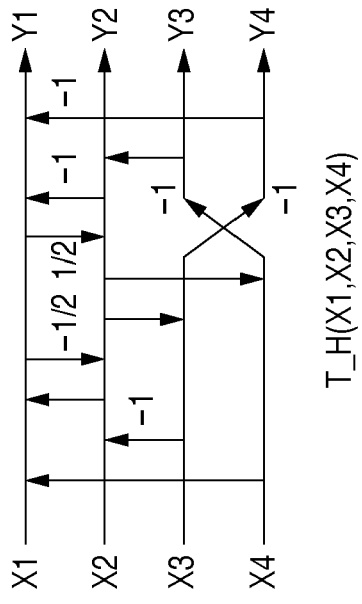
FIG. 8A
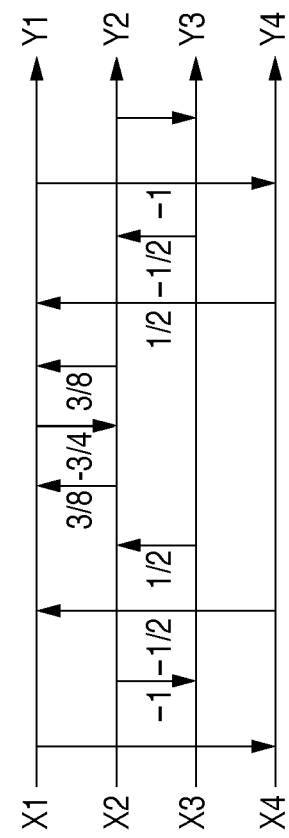
FIG. 8B
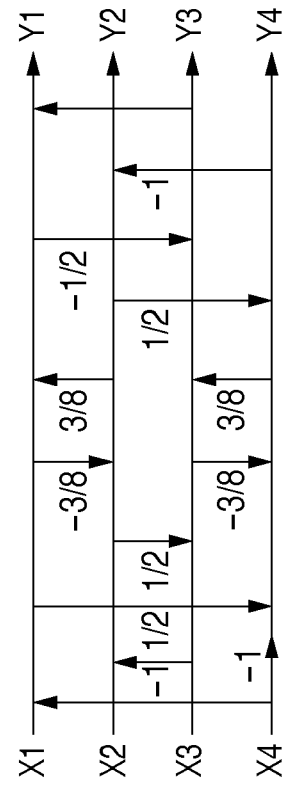
FIG. 8C
FIG. 8D $$\begin{cases} \text{WHEN QPindex} \leq 16 \\ \text{QP=QPindex} \\ \\ \text{WHEN QPindex} > 16 \\ \text{QP=((QPindex\%16)+16)} << ((\text{QPindex} >> 4)-1) \end{cases}$$

|   |   |   |   |   |   |
|---|---|---|---|---|---|
|   |   |   |   |   |   |
|   |   | D | T |   |   |
|   |   | L | X |   |   |
|   |   |   |   |   |   |

FIG. 13

|   | 1 | 2 | 3 |
|---|---|---|---|
| 4 | 5 | 6 | 7 |
| 8 | 9 | 10 | 11 |
| 12 | 13 | 14 | 15 |

T_s(a,b)

T_Ro(a,b)

IMAGE ENCODING APPARATUS AND CONTROL METHOD THEREOF

BACKGROUND OF THE INVENTION

1. Field of the Invention

The present invention relates to an image data encoding technique.

2. Description of the Related Art

Recent spread of personal computers and mobile terminals has led to broad use of digital data communication (data communication) via the Internet. Digital data used in data communication include images. As a characteristic feature of digital images, for example, copy, search, and various kinds of image processing are relatively easy. Hence, a lot of people handle digital images.

For efficient use of digital images, image compression to reduce the file size is indispensable. Typical techniques are JPEG and PNG. Image compression may distort an image. Techniques of suppressing image quality degradation have been researched and developed. Techniques of attaining not only the primary function of reducing the file size but also attaining various other functions have also been developed. For example, JPEG 2000 enables encoded data generation by scalably decoding image data gradually from a low resolution up to its original resolution.

Techniques having an image quality improving function in addition to the above-described resolution scaling function have also been developed. For example, Japanese Patent Laid-Open No. 2006-197573 discloses this technique. This reference or a technique based on this reference is called HD Photo® in general. More specifically, an image is segmented into tiles. DCT (Discrete Cosine Transform) is repeatedly performed for the respective tiles, thereby generating stream data of layers. To suppress block distortion generated among the tiles, predetermined processing is executed using the pixels of two adjacent tiles before or during the DCT.

The above reference aims at improving the quality of a decoded image having the same resolution as the input image.

Recent image sensing apparatuses represented by a digital camera have a resolution of more than 10,000,000 pixels. The resolution of an original sensed image is too high for an information processing apparatus represented by a computer to display, so the apparatus can display only part of it. It is therefore necessary to generate and display image data at a resolution lower than that of the original image. In the above-described reference, however, if an image having a resolution lower than the original resolution is generated, the image quality may degrade because the technique only aims at improving the quality of a decoded image having the same resolution as the original image.

SUMMARY OF THE INVENTION

The present invention has been made in consideration of the above-described problem, and provides a technique of generating encoded data enhancing an effect of suppressing block noise upon reproduction at a lower resolution in accordance with the resolution of an encoding target image in light of a tendency to decode and display an image at a resolution equal to or lower than its original resolution as the resolution rises.

In order to solve the above problem, for example, an image encoding apparatus according to the present invention has the following arrangement. More specifically, the image encoding apparatus which, defining a region including a plurality of pixels as a block, and a region including a plurality of blocks as a macro block, inputs image data including a plurality of macro blocks, generates encoded data of each macro block by processing the block as a minimum unit, and generates encoded data of the image data by arranging the encoded data of the macro blocks in a preset order, comprises: an input unit which inputs the image data including the plurality of macro blocks; a frequency conversion unit which frequency-converts each block to obtain one DC component data and a plurality of AC component data from each block; a block overlap processing unit which filters data in a region across a boundary between adjacent blocks to suppress discontinuity of data at the boundary; a setting unit which sets one of "0", "1", and "2" as an execution count of the block overlap processing unit based on a resolution of the image data of an encoding target; a quantizing unit which quantizes each component data obtained by the frequency conversion unit; an entropy encoding unit which entropy-encodes each component data after quantization by the quantizing unit; and a control unit which executes the frequency conversion unit twice, and executes the block overlap processing unit as many times as the count set by the setting unit, wherein when the execution count set by the setting unit is "0", the control unit (a) executes the frequency conversion unit of first time to frequency-convert each block in the macro block including the plurality of blocks, thereby calculating a plurality of DC component data of first level and a plurality of AC component data of first level, (b) executes the frequency conversion unit of second time to calculate one DC component data of second level and a plurality of AC component data of second level, while defining the plurality of DC component data of first level as a block, and executes the processes (a) and (b) for the image data including the plurality of macro blocks, when the execution count set by the setting unit is "1", the control unit (c) executes the block overlap processing unit to execute the block overlap processing for each block in the macro block including the plurality of blocks, (d) executes the frequency conversion unit of first time to frequency-convert each block in the macro block processed by the block overlap processing unit, thereby calculating a plurality of DC component data of first level and a plurality of AC component data of first level, (e) executes the frequency conversion unit of second time to calculate one DC component data of second level and a plurality of AC component data of second level, while setting the plurality of DC component data of first level as a frequency conversion target, and executes the process (c) to (e) for the image data including the plurality of macro blocks, and when the execution count set by the setting unit is "2", the control unit (f) executes the block overlap processing unit of first time to execute the block overlap processing for each block in the macro block including the plurality of blocks, (g) executes the frequency conversion unit of first time to frequency-convert each block in the macro block processed by the block overlap processing unit of first time, thereby calculating a plurality of DC component data of first level and a plurality of AC component data of first level, (h) executes the block overlap processing unit of second time to execute the block overlap processing for each block including the plurality of DC component data of first level in the image data including the plurality of macro blocks, the plurality of DC component data of first level being obtained by executing the frequency conversion unit of first level, and (i) executes the frequency conversion unit of second time to execute frequency conversion as many times as the number of blocks included in a set of the DC component data of first level obtained by the block overlap processing unit of second time.

According to the present invention, it is possible to generate encoded data without noticeable image quality degradation when reproducing an image at a lower resolution not to mention the original resolution.

Further features of the present invention will become apparent from the following description of exemplary embodiments with reference to the attached drawings.

BRIEF DESCRIPTION OF THE DRAWINGS

FIG. 8A is a view showing pixel positions in a block in frequency conversion processing;

FIG. 8B to FIG. 8D are views showing the structures of three filters;

FIG. 13 is a view showing the data arrangement of process target blocks of low-pass component prediction;

DESCRIPTION OF THE EMBODIMENTS

The embodiments of the present invention will now be described in detail with reference to the accompanying drawings.

In the embodiments of the present invention to be described below, implementation in a digital camera will be explained. For the descriptive convenience, the digital camera of each embodiment can capture an image at an ultrahigh resolution (a resolution of more than 10,000,000 pixels). The display of a general-purpose information processing apparatus such as a personal computer normally has only about 1600×1200 pixels (≈2,000,000 pixels) and cannot display a whole sensed image at its full resolution. It is therefore necessary to generate, on the display, a reduced image having an intermediate resolution lower than the original resolution. In the embodiments, when capturing an ultrahigh-resolution image, an image that has an intermediate resolution but minimum degradation in quality is generated.

First Embodiment

Figure 21:
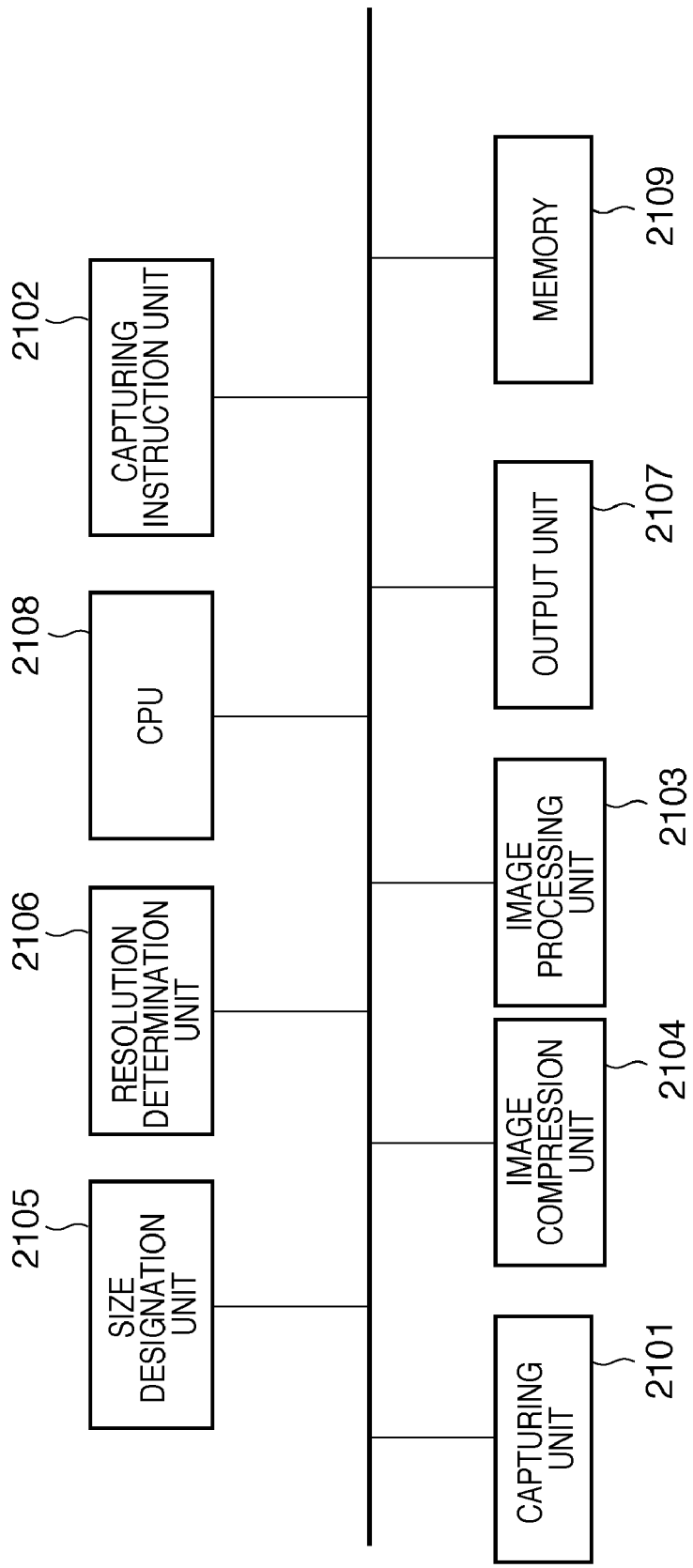
FIG. 21 is a block diagram showing the arrangement of a digital camera according to the first embodiment.

FIG. 21 is a block diagram showing the arrangement of a digital camera (image processing apparatus) according to the embodiment. The digital camera includes a capturing unit 2101, capturing instruction unit 2102, image processing unit 2103, image compression unit 2104, size designation unit 2105, resolution determination unit 2106, and output unit 2107. The digital camera also includes a CPU 2108 functioning as a control unit for the entire apparatus, and a memory 2109 that stores programs to be executed by the CPU 2108 and serves as a work area. The memory 2109 also stores various kinds of set information.

On the digital camera of the embodiment, a user can designate, via the size designation unit 2105, the resolution (size) of an image to be captured before capturing. Three sizes L, M, and S are selectable. The size L is 4000 horizontal pixels× 3000 vertical pixels (to be referred to as 4000×3000 pixels hereinafter). The size M is 2000×1500 pixels. The size S is 1600×1200 pixels. That is, the capturing unit 2101 of the digital camera of the embodiment includes an image sensing element having a resolution of 4000×3000 pixels. Information representing the selected size is stored in a preset area of the memory 2109.

When the user sets the resolution via the size designation unit 2105, as described above, and operates a shutter button included in the capturing instruction unit 2102, an image is captured at the designated resolution. The image processing unit 2103 performs image processing (e.g., white balance processing) of the image data obtained by capturing. The image compression unit 2104 executes compression-coding processing to be described later. The CPU 2108 stores the generated encoded data in a memory card (not shown) connected to the output unit 2107.

Figure 22:
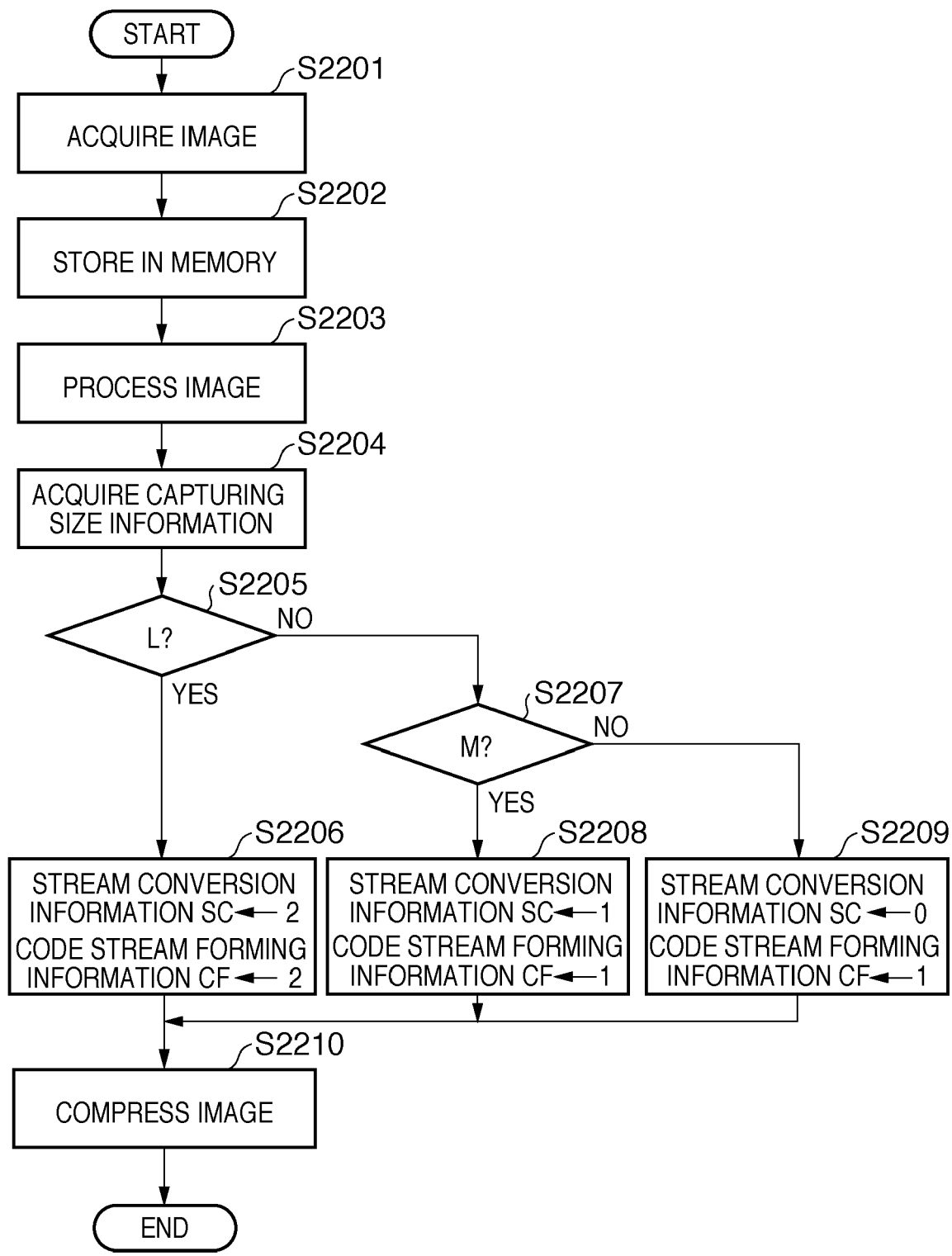
FIG. 22 is a flowchart illustrating the processing procedure of image capturing according to the first embodiment.

FIG. 22 is a flowchart illustrating the processing procedure of the CPU 2108 when the shutter button is operated. Processes such as AF and AE are not directly relevant to the present invention, and a description thereof will be omitted.

First, the CPU 2108 converts a photoelectrically converted signal obtained by the capturing unit 2101 into digital data, acquires the converted data as image data (step S2201), and temporarily stores it in the memory 2109 (step S2202).

The CPU 2108 controls the image processing unit 2103 and causes it to execute image processing of the image data stored in the memory 2109 (step S2203). The image processing includes processing of converting RGB data in a Bayer matrix into a normal arrangement, white balance processing, sharpness processing, and color processing. The image data as the image processing result is stored in the memory 2109 again. After the image processing, the process advances to step S2204. The CPU 2108 acquires set size information from the memory 2109 (step S2204), and determines the size designated by the user (step S2205).

If the size L is designated (YES in step S2205), the CPU 2108 sets "2" in each of two pieces of information about image compression, i.e., stream conversion information SC and code stream forming information CF, and sets them in the image compression unit 2104 (step S2206). That is, the stream conversion information and code stream forming information can be regarded as parameters for image compression of the image compression unit 2104.

The stream conversion information SC and the code stream forming information CF will be described later in detail. In this embodiment, the stream conversion information SC takes three values "0", "1", and "2". "2" gives the instruction for processing of improving image quality at an intermediate resolution. The stream conversion information SC is also used as information representing the execution count of frequency conversion processing to be described later. The code stream forming information CF takes two values "1" and "2". "2" instructs code stream formation of intermediate resolution priority. When both the stream conversion information SC and the code stream forming information CF are "2", the sequence involves complex processing, and the time required for processing increases. However, an L-size image has an enormous number of pixels and is therefore rarely displayed at the maximum resolution in actual display step. It will probably be displayed at an intermediate resolution lower by some grades than the maximum resolution. In this embodiment, if the size L is set, both the stream conversion information SC and the code stream forming information CF are set to "2", as described above, to perform processing corresponding to processing after display processing.

If the designated size is not L (if the size M or S is designated), the process advances to step S2207. The CPU 2108 determines whether the designated size is M. If the size M is designated, the CPU 2108 sets the stream conversion information SC "1" and the code stream forming information CF "1" in the image compression unit 2104 in step S2208.

Upon determining that the designated size is not M, i.e., the size S is designated, the CPU 2108 sets the stream conversion information SC "0" and the code stream forming information CF "1" in the image compression unit 2104 in step S2209.

The process then advances to step S2210. The CPU 2108 causes the image compression unit 2104 to start compression processing.

Details of the image compression unit 2104 according to the embodiment will be described next.

The image compression unit 2104 of the embodiment employs the HD Photo technique of the above-described reference. A characteristic part of the image compression unit 2104 of the embodiment will be explained below.

Figure 1:
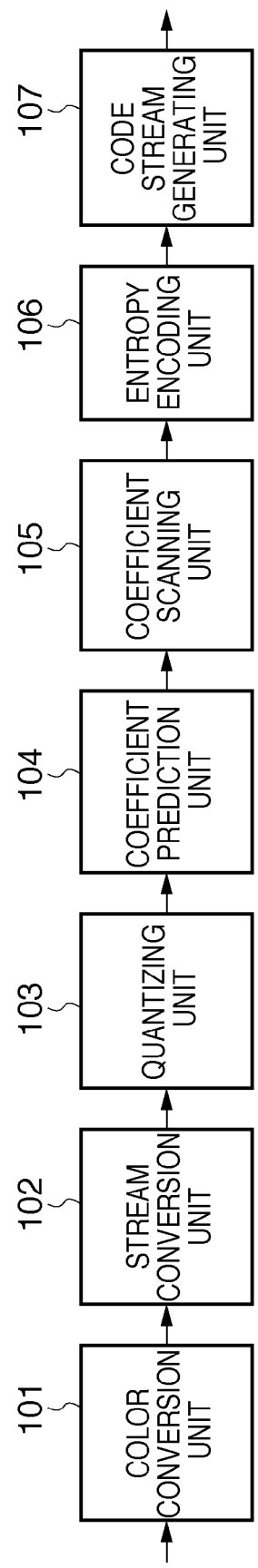
FIG. 1 is a block diagram showing the arrangement of an image compression unit according to an embodiment.

FIG. 1 is a block diagram showing the arrangement of the image compression unit 2104 according to the embodiment.

The image compression unit 2104 includes a color conversion unit 101, stream conversion unit 102, quantizing unit 103, coefficient prediction unit 104, coefficient scanning unit 105, entropy encoding unit 106, and code stream generating unit 107.

Terms will be described. "Block" is the minimum unit of encoding processing and has a size of 4×4 pixels in the embodiment. "Macro block" is a unit containing a plurality of blocks, which are 4×4 blocks (i.e., 16×16 pixels) in the embodiment. "Tile" is a unit containing a plurality of macro blocks, which are M×N (M and N are integers of 1 or more, and one of them is 2 or more) macro blocks. In the embodiment, M=6, and N=4. That is, one tile has a size corresponding to 6×4 macro blocks=96×64 pixels. The definitions of a block, macro block, and tile here are merely examples, and their sizes do not limit the present invention. The image compression unit 2104 compression-codes each tile. The minimum unit of the processing is a block (4×4 pixels).

The color conversion unit 101 converts RGB data (in the embodiment, each component has 8 bits=256 tones) into a YUV color space, and outputs the conversion result to the stream conversion unit 102. The RGB→YUV conversion is done in accordance with, e.g., a conversion formula shown in FIG. 3.

The Y, U, and V components are individually encoded. For the sake of simplicity, Y (luminance) will be explained below. Note that image data in the following description indicates image data expressed by the Y component (understanding of the U and V components can be obtained by properly substituting them for the Y component).

Figures 2, 3:
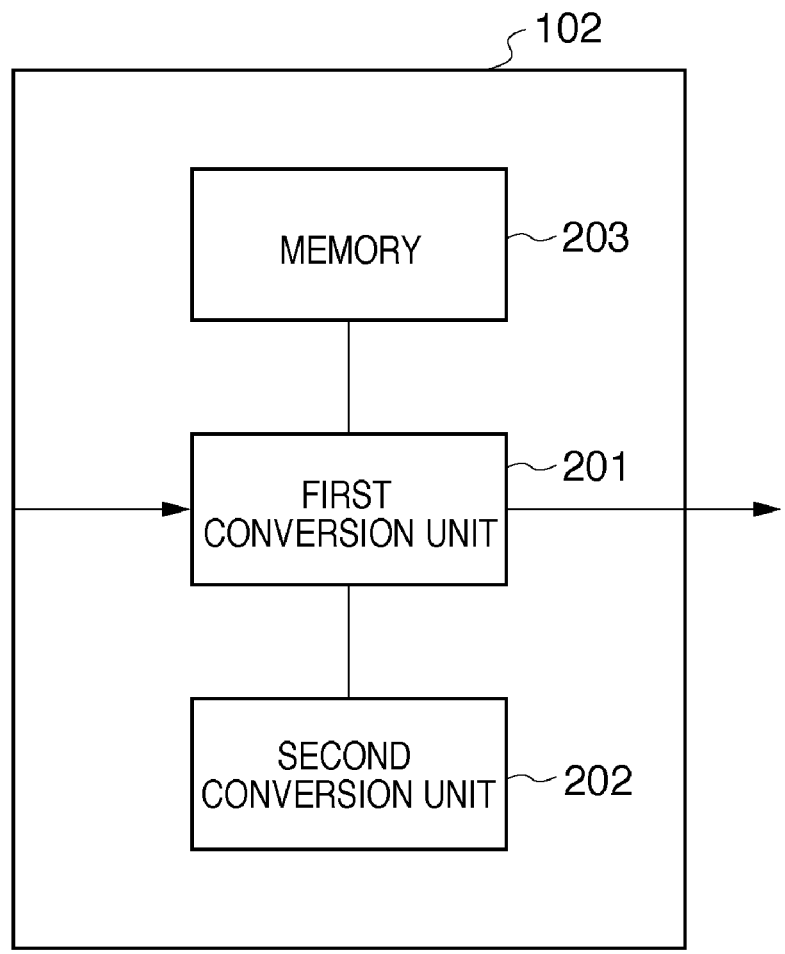
FIG. 2 is a block diagram showing the arrangement of a stream conversion unit according to the embodiment.
FIG. 3 is a view showing an example of a formula of color conversion.

The stream conversion unit 102 includes a first conversion unit 201, second conversion unit 202, and memory 203, as shown in FIG. 2. The first conversion unit 201 performs essential processing and also controls the stream conversion unit 102. The second conversion unit 202 performs optional processing which need not always be executed. The first conversion unit 201 is in charge of handling to determine whether to cause the second conversion unit 202 to execute processing. If the second conversion unit 202 executes processing, the load on encoding processing and the time required for the processing increase. However, a decoded image (especially, an image having a resolution lower than the original resolution) has a more desirable image quality. The memory 203 holds the above-described stream conversion information SC.

Figure 4:
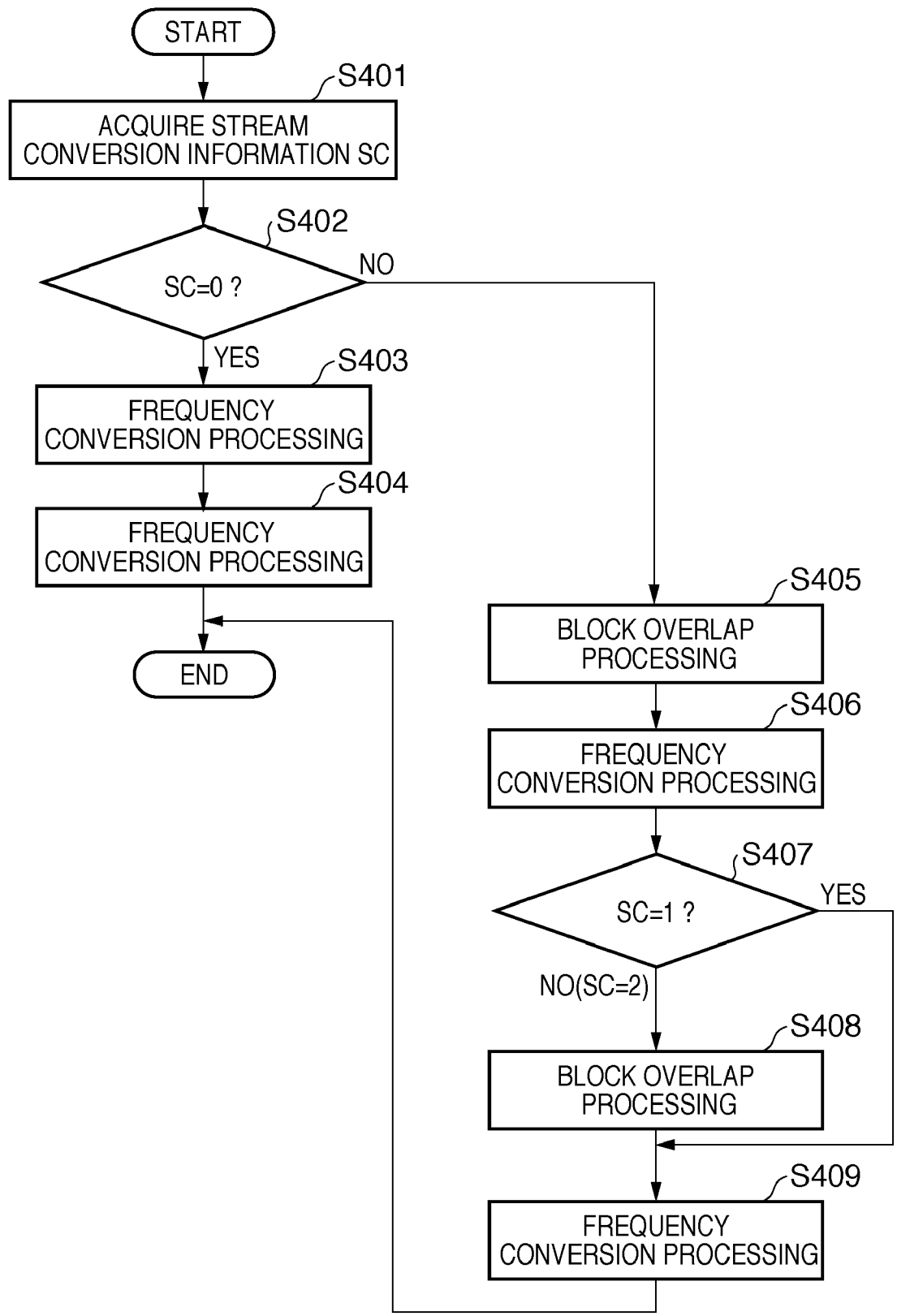
FIG. 4 is a flowchart illustrating the processing procedure of the stream conversion unit according to the embodiment.
Figure 5:
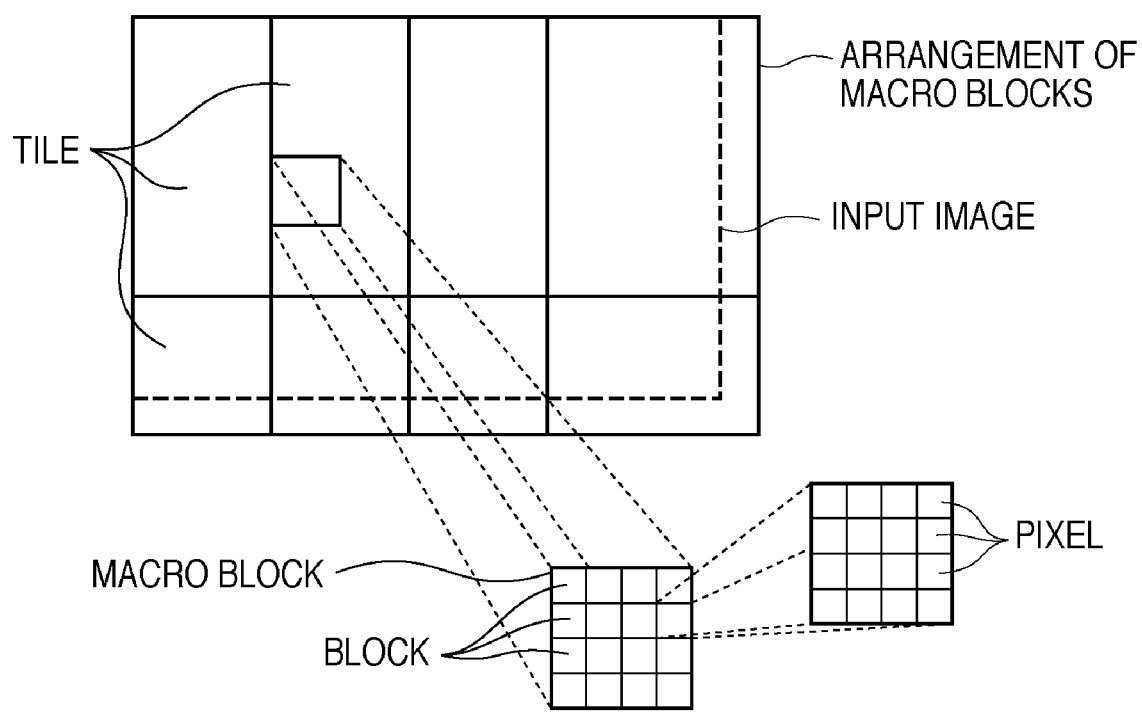
FIG. 5 is a view showing the relationship between tiles, macro blocks, and blocks in an image according to the embodiment.

The stream conversion unit 102 receives Y component data, and segments the image into tiles, as shown in FIG. 5 (in the embodiment, one tile includes 6×4 macro blocks). The memory 203 stores the stream conversion information SC ("0", "1", or "2"). The first conversion unit 201 and the second conversion unit 202 execute processing in accordance with the flowchart in FIG. 4.

In step S401, the first conversion unit 201 acquires the stream conversion information SC from the memory 203. In step S402, the first conversion unit 201 determines whether the stream conversion information SC is "0".

If the stream conversion information SC is "0", the first conversion unit 201 does not request conversion processing of the second conversion unit 202. The first conversion unit 201 executes frequency conversion processing twice in steps S403 and S404. This processing will be described in detail with reference to FIG. 6.

First, each of 4×4 blocks included in one macro block undergoes frequency conversion processing (first stage). One DC component (direct current component) data and 15(=4×4−1) AC component (alternating current component) data are obtained from one block. As described above, one macro block includes 4×4 blocks. Hence, 4×4 DC component data and 15×4×4 AC component data are obtained from one macro block. A set of 4×4 component values will be called a DC block.

This is the process in step S403, i.e., the first frequency conversion processing.

The process in step S404 (second frequency conversion processing) will be described next.

The target of the second frequency conversion in step S404 is the above-described DC block (second stage). As a result, one DC component value and 15 AC component values are obtained from the DC block. The latter AC component values are calculated from the DC components of the DC block (4×4 pixels) and are therefore represented as ACDC components in FIG. 6.

To discriminate the components generated in steps S403 and S404, the DC component data and the AC component data obtained in the first process (step S403) may be called DC component data of first level and AC component data of first level, respectively. The DC component data and the ACDC component data obtained in the second process (step S404) may be called DC component data of second level and AC component data of second level, respectively.

Figure 7:
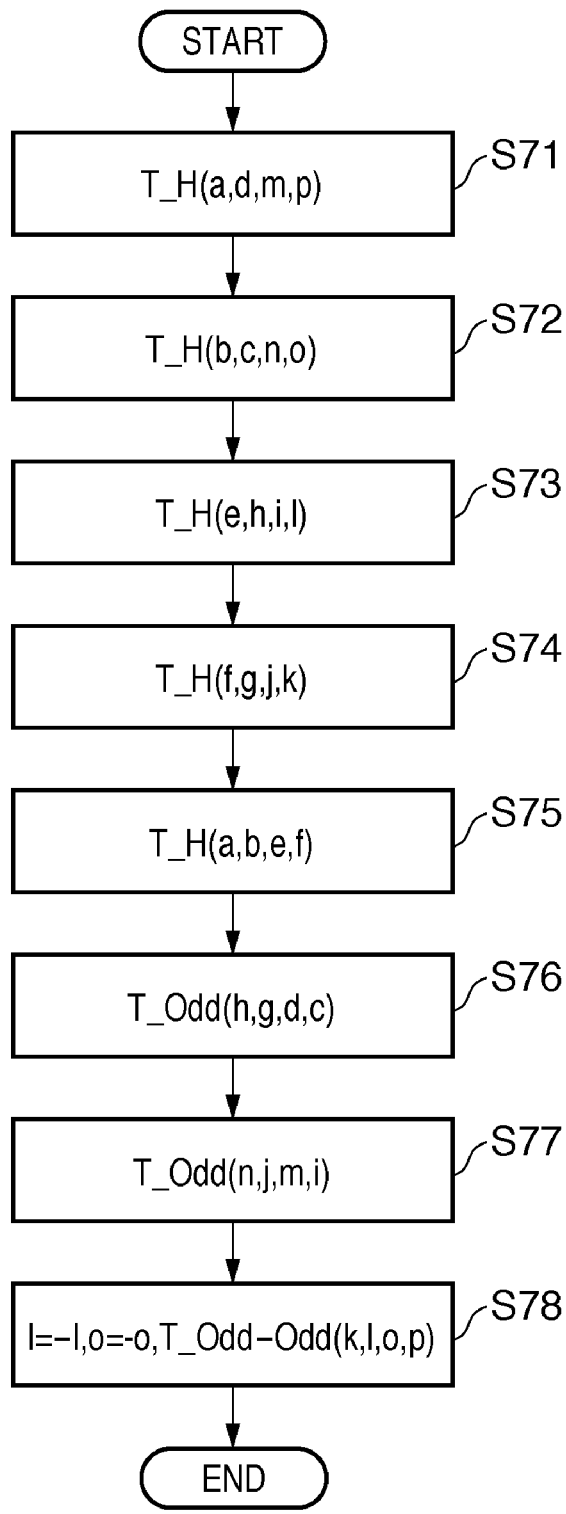
FIG. 7 is a flowchart illustrating the processing procedure of frequency conversion processing.

The frequency conversion processing is performed in accordance with the procedure of the flowchart in FIG. 7. Note that the flowchart illustrates processing of one block (4×4 pixels). That is, since a macro block includes 4×4 blocks, processing conforming to the flowchart in FIG. 7 is performed 16 times in the first frequency conversion processing (step S403).

Conversion processing (filtering processing) in each of steps S71 to S78 of the flowchart in FIG. 7 is performed by one of conversion circuits (filtering circuits) shown in FIG. 8B to FIG. 8D, which has the same name as the processing. Arguments a to p of each conversion processing in FIG. 7 correspond to pixel positions a to p in a block of interest shown in FIG. 8A.

First conversion processing T_H(a, d, m, p) in step S71 of FIG. 7 is executed by the circuit shown in FIG. 8B. More specifically, a, d, m, and p in FIG. 8A are set in input terminals X1, X2, X3, and X4 in FIG. 8B, respectively, and calculation starts. The initial values of a, d, m, and p are updated to four values that appear at output terminals Y1, Y2, Y3, and Y4. This also applies to processing from step S72. In step S78, after the signs of the data 1 and o are reversed, T_Odd_Odd calculation processing (FIG. 8D) is executed.

Plainly speaking of DC components of the processing in FIG. 7, in the first four processes (steps S71 to S74), temporary low frequency components obtained from the data of the block of interest (4×4 pixels) are concentrated to the 2×2 positions (a, b, e, and f in FIG. 8A) of the upper left corner. In step S75, one DC component of the block of interest is stored at the position "a" in FIG. 8A using the data of the 2×2 temporary low frequency components stored at the positions {a, b, e, f} of the upper left corner.

The 15 AC components are generated by the processes in steps S71 to S78.

The first frequency conversion processing is performed for each of the 16 blocks included in the macro block of interest in FIG. 7. In the second frequency conversion processing, processing represented by the flowchart in FIG. 7 is performed once, regarding that the DC block (4×4 DC component values) obtained from the macro block of interest has the arrangement shown in FIG. 8A.

As described above, the two frequency conversion processes yield one DC component, 15(=4×4−1) ACDC components, and 240(=15×4×4) AC components from one macro block.

Encoding processing of the embodiment generates encoded data of each tile. In the embodiment, one tile includes 6×4 macro blocks. Hence, the processes in steps S403 and S404 are repeated as many times as the macro blocks included in one tile.

Referring back to FIG. 4, if the first conversion unit 201 determines in step S402 that the stream conversion information SC acquired from the memory 203 is not "0", i.e., SC=1 or 2, the process advances to step S405. In step S405, the first conversion unit 201 instructs the second conversion unit 202 to start conversion processing.

The second conversion unit 202 performs correction processing across (overlapping) a block boundary to correct its distortion that occurs because the processing of the first conversion unit 201 is based on calculation in each block. The processing of the second conversion unit 202 will be referred to as block overlap processing hereinafter.

Figures 9, 10, 11:
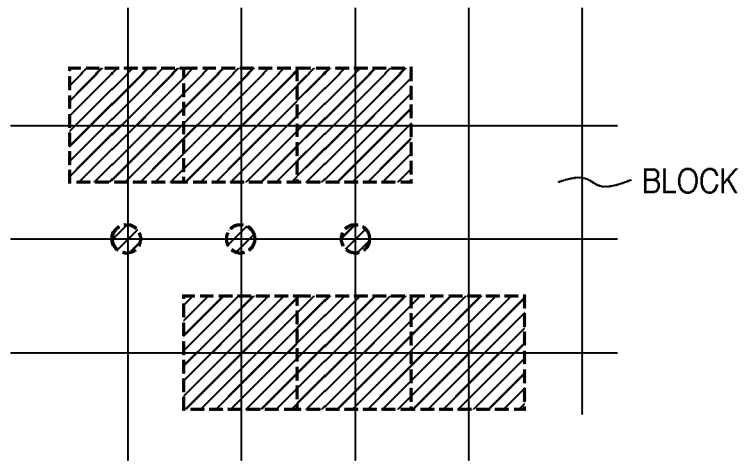
FIG. 9 is a view showing a target of block overlap processing.
FIG. 10 is a view showing examples of quantization parameter equations in quantization processing.
FIG. 11 is a view showing the relationship between a DC component X of interest and neighboring DC components to be referred to for its prediction processing according to the embodiment.

Upon receiving an activation instruction from the first conversion unit 201, the second conversion unit 202 performs block overlap processing using a window across (overlapping) the boundary between blocks (4×4 pixels) in an input tile, as shown in FIG. 9 (step S405).

Figure 19:
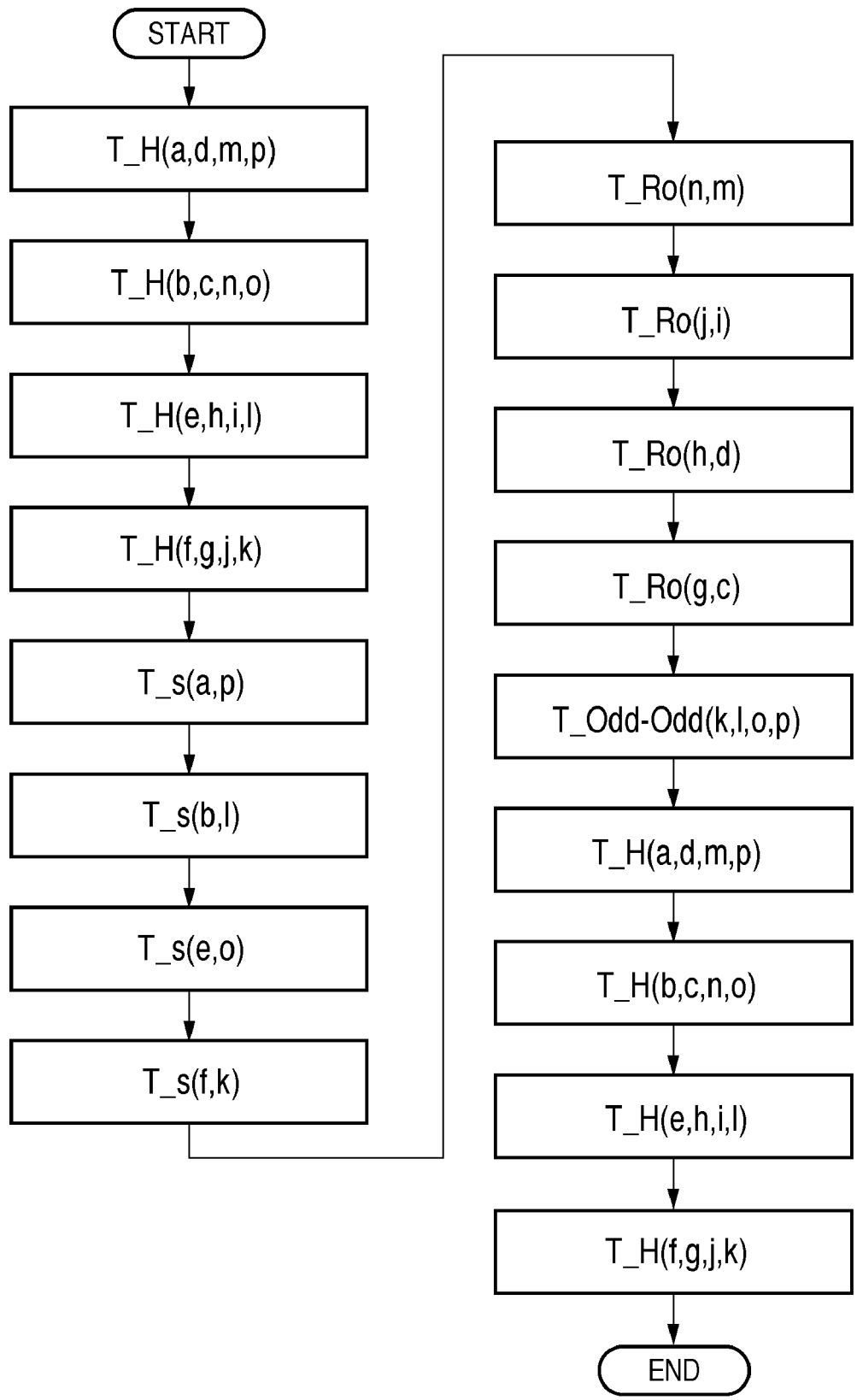
FIG. 19 is a flowchart illustrating the processing procedure of block overlap processing.
Figure 20A:
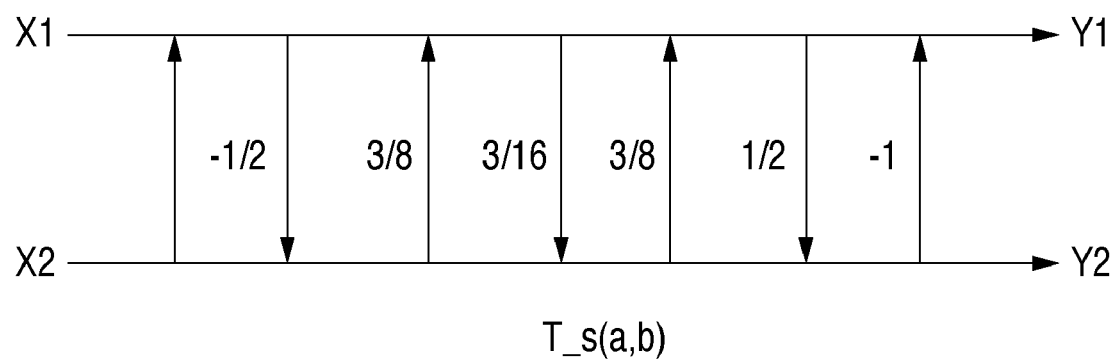
FIGS. 20A and 20B are views showing circuit arrangements corresponding to two conversion formulas in block overlap processing.
Figure 20B:
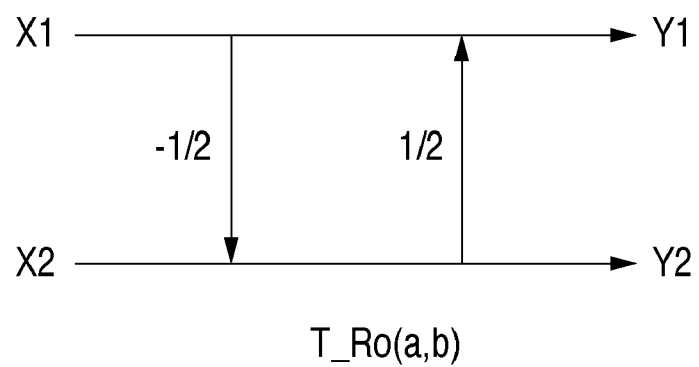

The block overlap processing is illustrated by the flowchart in FIG. 19. In FIG. 19, two filtering processes, i.e., T_s( ) and T_Ro( ) are added to the above-described processing shown in the flowchart of FIG. 7. The circuit arrangements shown in FIGS. 20A and 20B implement T_s( ) and T_Ro( ). T_s( ) and T_R processing are 2-input 2-output filtering processes.

The block overlap processing processes a range across the process target blocks of the above-described frequency conversion processing, thereby suppressing discontinuity at the block boundary of frequency conversion.

Then, the process advances to step S406. The first conversion unit 201 performs frequency conversion processing once. The frequency conversion processing in step S406 is executed for each of 4×4 blocks in a region corresponding to the macro block in FIG. 6. That is, 16 blocks are frequency-converted to calculate 16 DC components and 240 AC components, as in step S403. In the embodiment, one tile includes 6×4 macro blocks. Hence, the processing is executed 24 times.

Next, in step S407, the first conversion unit 201 determines whether the stream conversion information SC acquired from the memory 203 is "1". If it is determined that the stream conversion information SC is "1", the process advances to step S409. If it is determined that the stream conversion information SC is not "1", i.e., "2", the process advances to step S408 to cause the second conversion unit 202 to execute second block overlap processing (FIG. 19).

Note that 6×4 DC blocks are targeted for the block overlap processing executed by the second conversion unit 202 in step S408.

In step S409, second frequency conversion processing is executed. The second frequency conversion processing is the same as in step S404 except that it targets the set of a plurality of DC blocks included in one tile that has undergone the process in step S406 or S408. More specifically, one tile includes 6×4 macro blocks. Hence, the frequency conversion is executed for 24 DC blocks.

The above-described processing will be summarized. The sequence of processing for a macro block according to the embodiment is as follows.

When the size of an image to be captured is S:
Frequency conversion processing→frequency conversion processing When the size of an image to be captured is M:
Block overlap processing→frequency conversion processing→frequency conversion processing When the size of an image to be captured is L:
Block overlap processing→frequency conversion processing→block overlap processing→frequency conversion processing The processing of the stream conversion unit 102 in FIG. 1 has been described above.

The stream conversion unit 102 outputs the conversion result to the quantizing unit 103 of the succeeding stage. The quantizing unit 103 sets a Q parameter (to be referred to as a QP hereinafter), and calculates a quantization step based on the set QP and the conversion formula shown in FIG. 10. Note that according to HD Photo, there are following three degrees of freedom in setting a QP to be described here, and a QP can be set by combining them. The embodiment also complies with it.

Axis of degree of freedom 1: spatial degree of freedom:
1.1 Set a single QP for all macro blocks in an image
1.2 Set a single QP for all macro blocks in a tile
1.3 Freely set a QP for each macro block in a tile
Axis of degree of freedom 2: frequency degree of freedom:
2.1 Set a single QP for all frequency components
2.2 Set a single QP for DC components and low-pass components (ACDC components), and different QPs for high-pass components (AC components)
2.3 Set a single QP for low-pass and high-pass components, and different QPs for DC components
2.4 Set a QP for each frequency component
Axis of degree of freedom 3: color plane degree of freedom:
3.1 Set a single QP for all color planes
3.2 Set a QP for a luminance plane, and a single QP for planes other than the luminance plane
3.3 Set a QP for each plane For example, quantization in conventional JFIF is done based on spatial degree of freedom 1.1 and color plane degree of freedom 3.2. Note that JFIF assigns a quantization step to each coefficient in a macro block and therefore has no item corresponding to the frequency degree of freedom.

The quantizing unit 103 thus ends the quantization processing and outputs the quantized data to the coefficient prediction unit 104. The coefficient prediction unit 104 performs coefficient prediction and outputs a prediction error. Coefficient prediction is executed based on different rules for the DC components, low-pass components, and high-pass components. A prediction calculation method is determined for each tile. Any coefficient of an adjacent tile is not used. Prediction calculation of each component by the coefficient prediction unit 104 will be described below.

(1) DC Component Prediction

Figure 6:
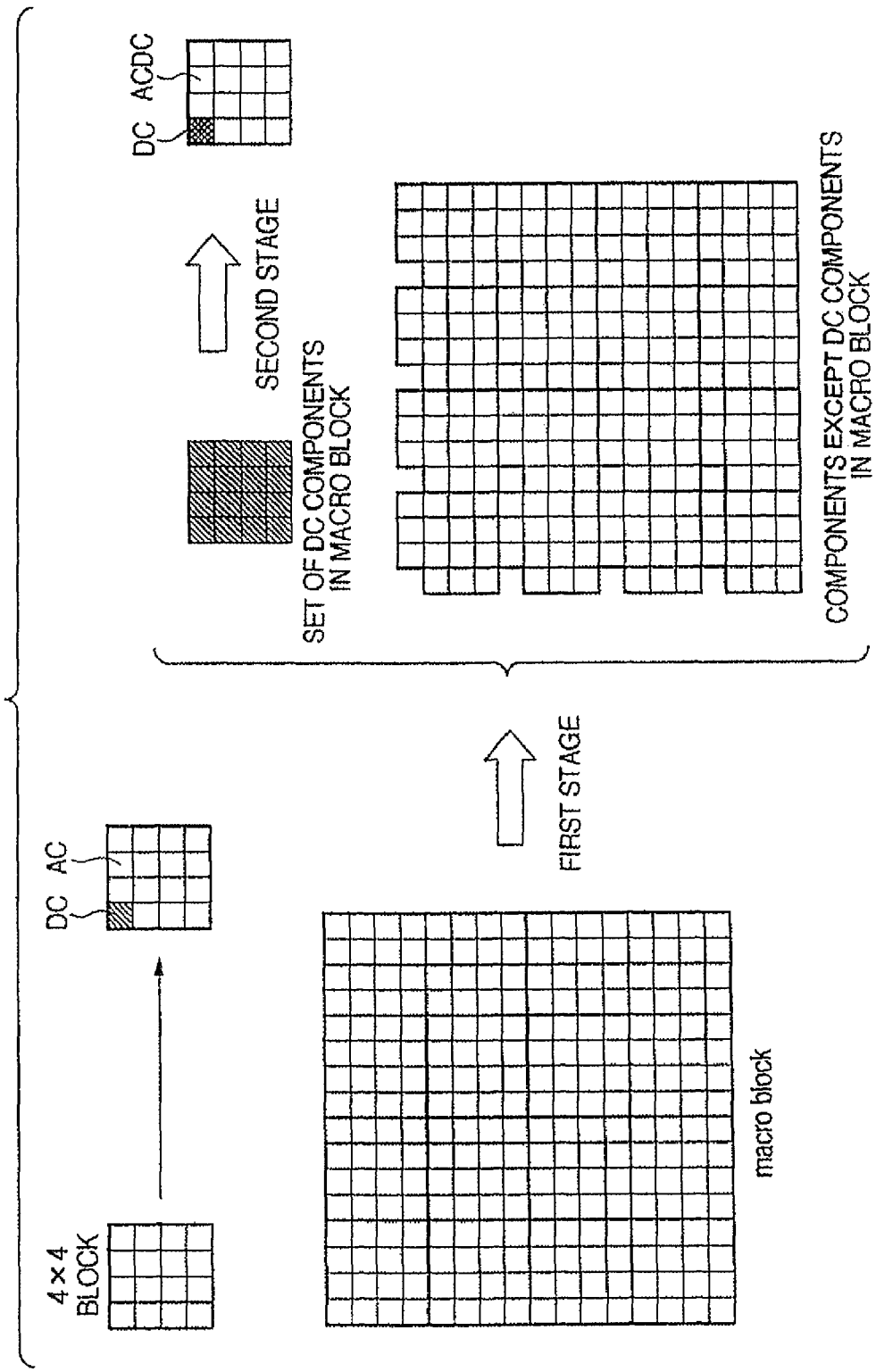
FIG. 6 is a view for explaining stream conversion processing.

As described above, in the embodiment, one tile includes 6×4 macro blocks. One DC component is obtained from one macro block (FIG. 6). Hence, 6×4 DC components that have undergone the quantization processing are obtained from one tile.

DC component prediction processing (prediction error calculation processing) of the coefficient prediction unit 104 will be described.

DC component values in one tile are raster-scanned. FIG. 11 shows the relationship between a DC component X of a macro block of interest and neighboring DC components D, T, and L relatively adjacent to the DC component X during scanning processing of a tile. Note that in raster scanning, the neighboring DC components D, T, and L near the DC component X of interest are located at positions where prediction processing (prediction error calculation) has already ended.

When the DC component X of interest is at the upper left corner, all the neighboring DC components D, T, and L are located outside the tile. When the DC component X of interest is on the first line except the upper left corner, the neighboring DC components D and T are located outside the tile. When the DC component X of interest is on the left edge except the upper left corner, the neighboring DC components D and L are located outside the tile. The neighboring DC components outside the tile to be referred to are assumed to have a predetermined value (e.g., "0"). The predetermined value need not always be "0" if it is the same as on the decoding side.

Figure 12:
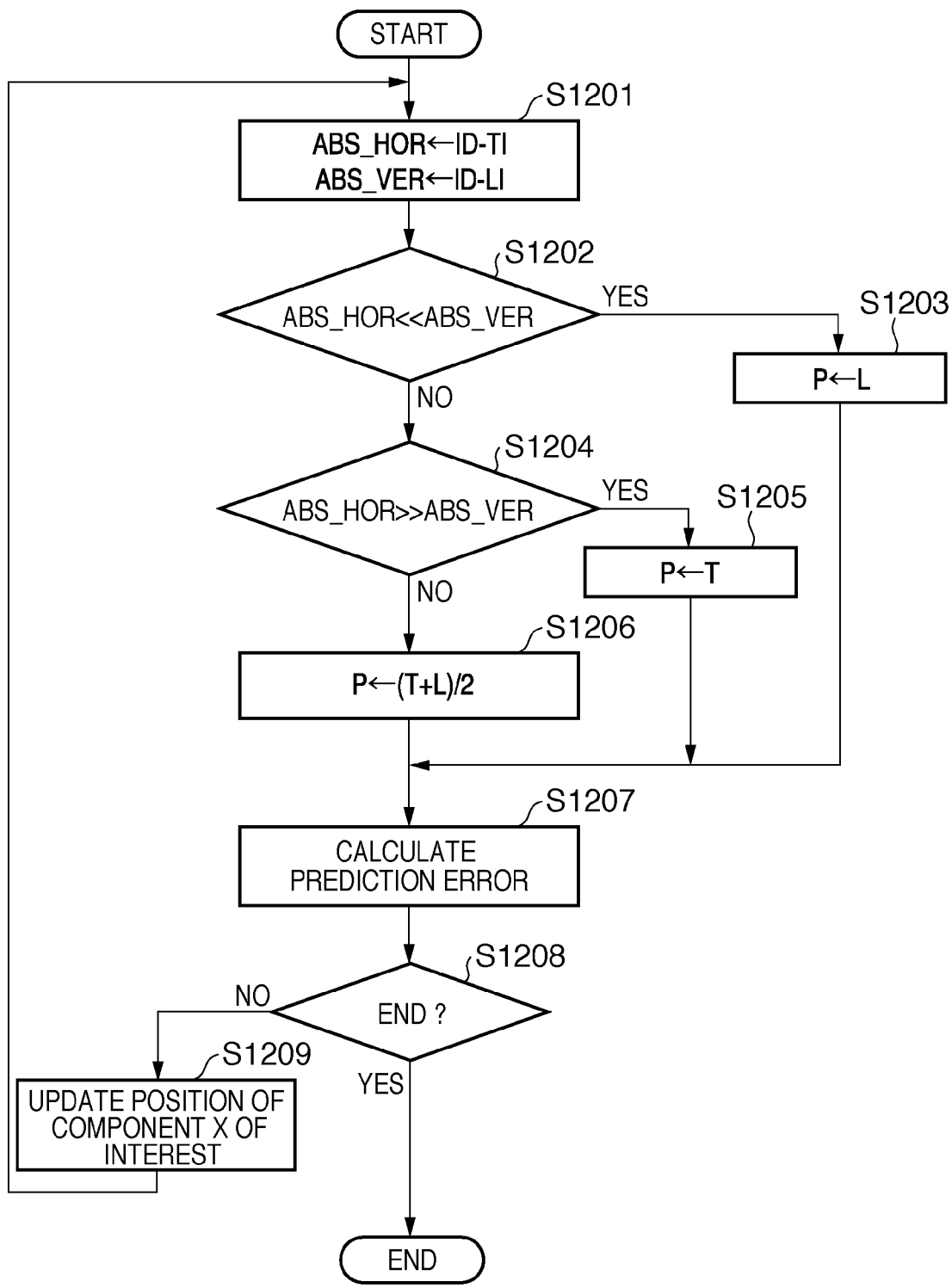
FIG. 12 is a flowchart illustrating the processing procedure of DC component prediction processing.

DC component prediction processing in a tile by the coefficient prediction unit 104 will be described below with reference to the flowchart in FIG. 12.

First, in step S1201, the coefficient prediction unit 104 calculates a difference absolute value (horizontal difference absolute value) ABS_HOR between the neighboring DC component values D and T, and a difference absolute value (vertical difference absolute value) ABS_VER between the neighboring DC component values D and L.

In step S1202, the coefficient prediction unit 104 determines whether ABS_HOR<<ABS_VER, i.e., ABS_HOR is sufficiently smaller than ABS_VER. More specifically, the coefficient prediction unit 104 determines that ABS_HOR is sufficiently smaller than ABS_VER when $$ABS\_HOR - ABS\_VER < Th$$

where Th is a predetermined positive threshold.

Plainly speaking of the process in step S1202, the coefficient prediction unit 104 determines whether similar images continue in the horizontal direction rather than in the vertical direction near the tile of interest (the position X in FIG. 11). If ABS_HOR<<ABS_VER in step S1202, the process advances to step S1203. The coefficient prediction unit 104 determines to use the left DC component L as a predicted value P of the DC component X of interest.

If NO in step S1202, the process advances to step S1204. In step S1204, the coefficient prediction unit 104 determines whether ABS_HOR>>ABS_VER, i.e., ABS_VER is sufficiently smaller than ABS_HOR. As in step S1202, the coefficient prediction unit 104 determines that ABS_VER is sufficiently smaller than ABS_HOR when $$ABS\_VER - ABS\_HOR < Th$$

If ABS_VER<<ABS_HOR (YES in step S1204), the difference between the DC component X of interest and the DC component T located adjacent in the vertical direction is small at a high probability. The process advances to step S1205. The coefficient prediction unit 104 determines to use the upper DC component T as the predicted value P of the DC component X of interest.

If NO in step S1204, the process advances to step S1206. The coefficient prediction unit 104 determines to use (T+L)/2 as the predicted value P of the DC component X of interest. Note that (T+L)/2 is obtained by calculating T+L and then shifting the value to the lower side by one bit (fractions below the decimal point are dropped).

In one of steps S1203, S1205, and S1206, the predicted value P of the DC component X of interest is obtained. In step S1207, the coefficient prediction unit 104 calculates, as a prediction error, the difference between the DC component X of interest and the predicted value P.

Then, the process advances to step S1208. The coefficient prediction unit 104 determines whether prediction error calculation has ended for all DC components in the tile of interest. If NO in step S1208, the position of the DC component X of interest is updated to the next position in step S1209, and the process returns to step S1201.

In the above-described way, prediction error calculation processing of the 6×4 DC components in the tile of interest is performed.

(2) Low-Pass Component Prediction

Figure 13:
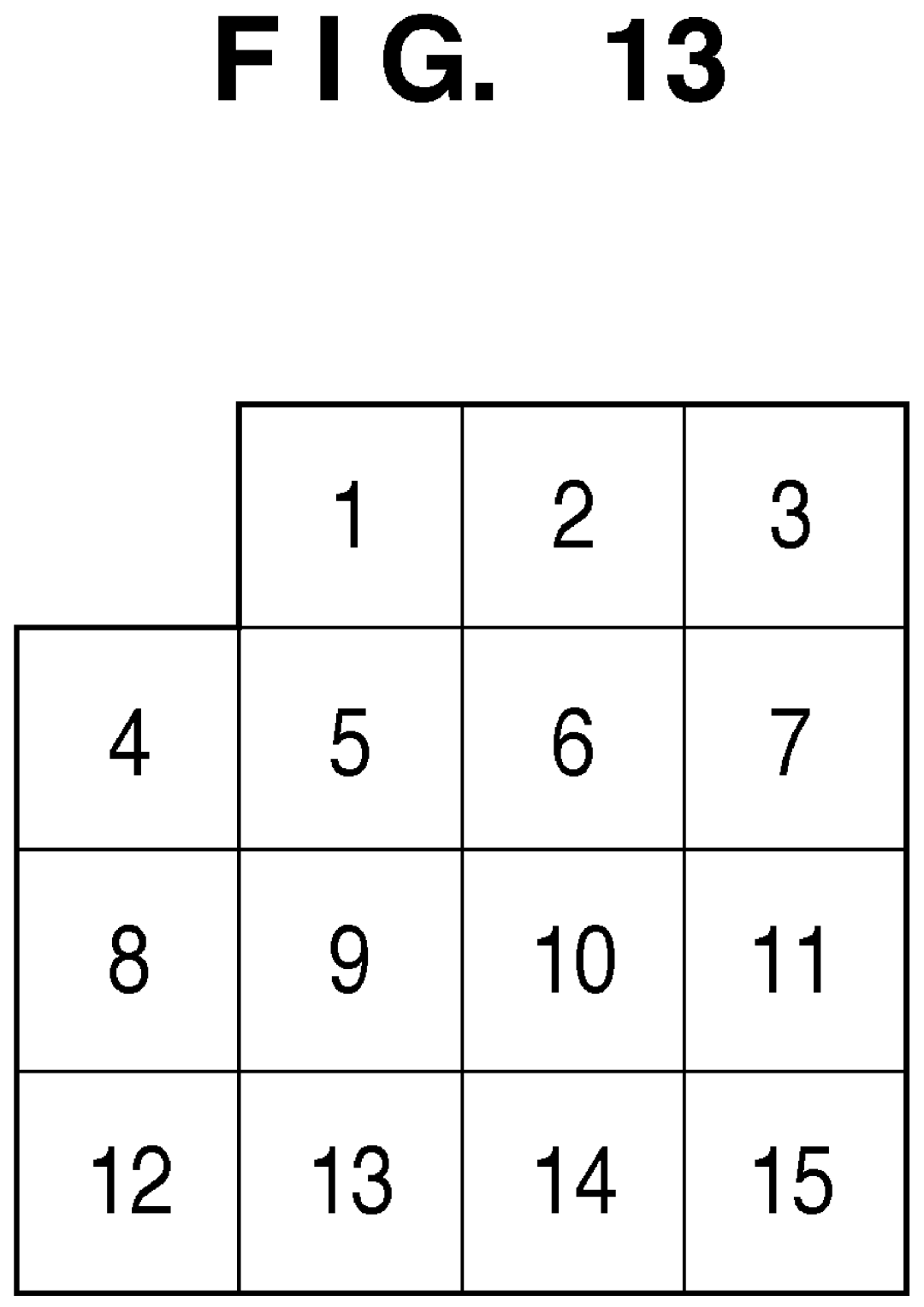

FIG. 13 shows the arrangement of ACDC components after quantization of one macro block. This arrangement also indicates ACDC component values (FIG. 6) obtained by performing second frequency conversion processing for a macro block. Targets of low-pass component prediction processing are ACDC components {1, 2, 3} or ACDC components {4, 8, 12} in FIG. 13. For example, when it is determined to perform prediction processing of the ACDC components {4, 8, 12} in FIG. 13, the ACDC components {1, 2, 3, 5, 6, 7, 9, 10, 11, 13, 14, 15} at the remaining positions do not undergo prediction error calculation processing.

If the macro block of interest is located on the left edge or upper edge of the tile, there is no macro block which is adjacent to the macro block of interest and should be referred to. If no macro block to be referred to exists, it is assumed that {1, 2, 3} have undergone prediction error calculation in the inexistent macro block. The prediction error calculation targets may be {4, 8, 12}. That is, the targets need only be the same on the encoding side and on the decoding side.

Figure 14:
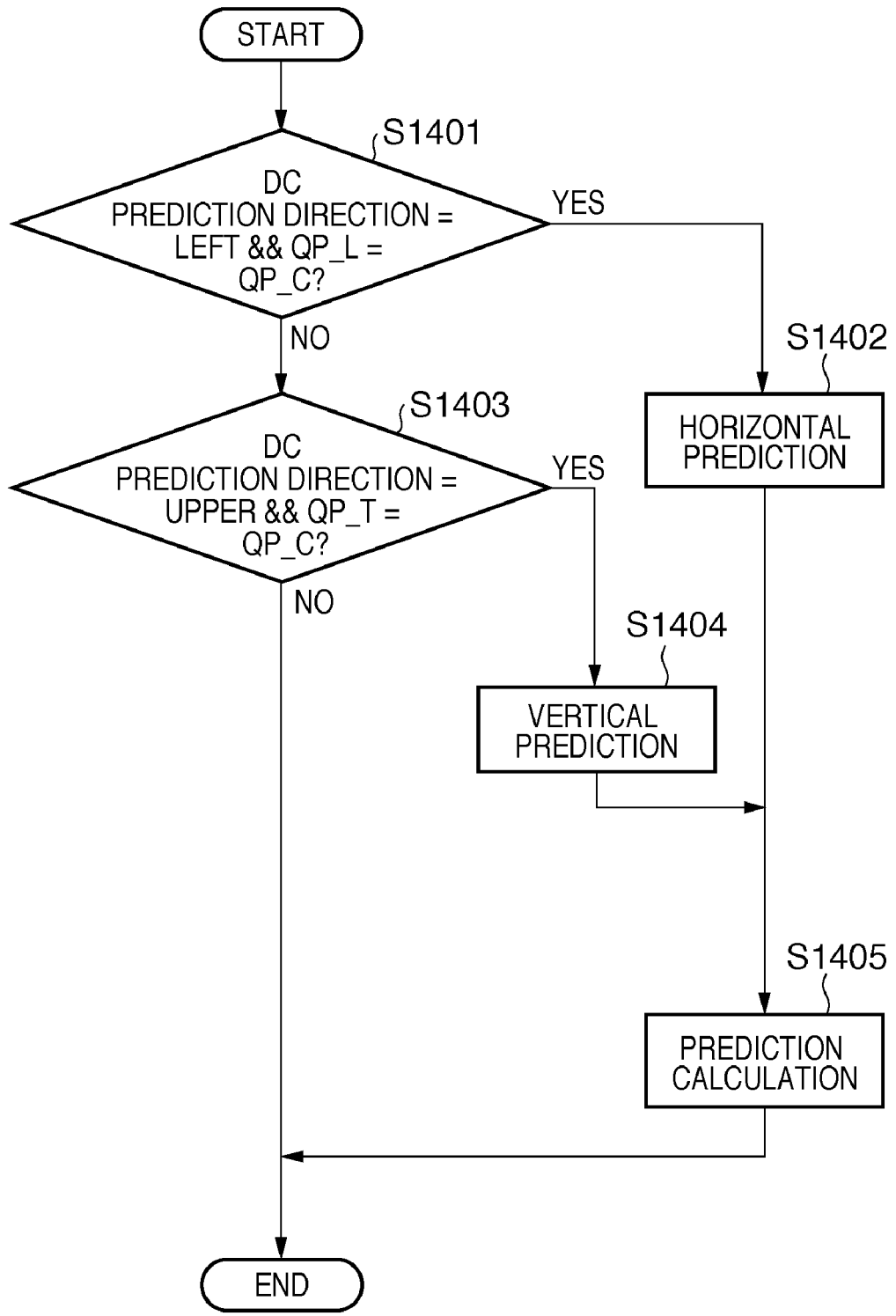
FIG. 14 is a flowchart illustrating the processing procedure of low-pass component prediction processing.

FIG. 14 is a flowchart illustrating the processing procedure of low-pass component prediction processing of the coefficient prediction unit 104. The processing will be described below with reference to the flowchart.

In step S1401, the coefficient prediction unit 104 determines whether the DC prediction direction of the macro block on the left side of the block of interest is horizontal, and a quantization parameter QP_C of the DC component of the macro block of interest equals a quantization parameter QP_L of the DC component of the macro block on the left side of the macro block of interest. If the two conditions are satisfied (YES in step S1401), the coefficient prediction unit 104 determines the horizontal direction as the prediction direction of the block of interest (step S1402). More specifically, {1, 2, 3} in FIG. 13 are determined as prediction error calculation targets, and the remaining components are excluded from the targets. The coefficient prediction unit 104 executes prediction error calculation in step S1405.

If NO in step S1401, the coefficient prediction unit 104 advances the process to step S1403. In step S1403, the coefficient prediction unit 104 determines whether the DC prediction direction of the macro block on the upper side of the block of interest is vertical, and the quantization parameter QP_C of the DC component of the macro block of interest equals a quantization parameter QP_T of the DC component of the macro block on the upper side of the macro block of interest. If the two conditions are satisfied, the coefficient prediction unit 104 determines the vertical direction as the prediction direction of the block of interest (step S1404).

More specifically, {4, 8, 12} in FIG. 13 are determined as prediction error calculation targets, and the remaining components are excluded from the targets. The coefficient prediction unit 104 executes prediction error calculation in step S1405.

If NO in step S1403, the processing ends without performing prediction error calculation for the ACDC components in the macro block of interest.

(3) High-Pass Component Prediction

Figure 15C:
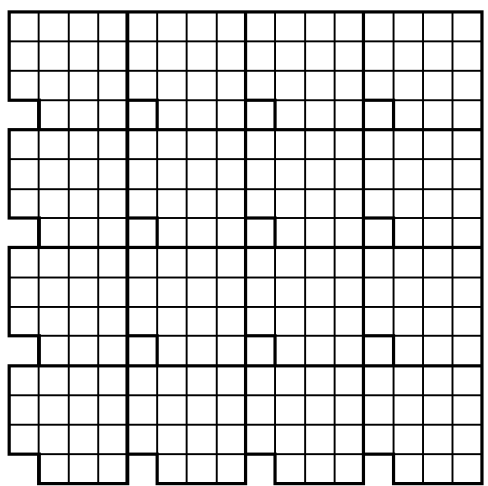
FIG. 15A to FIG. 15C are views showing the relationship between the scanning direction and the data arrangement of process target blocks of low-pass component prediction.
Figure 15B:
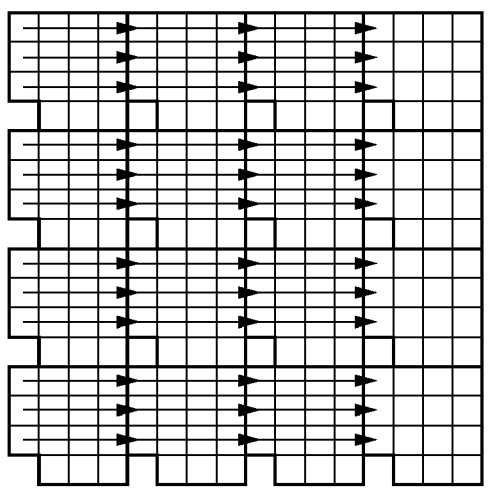
Figure 15A:
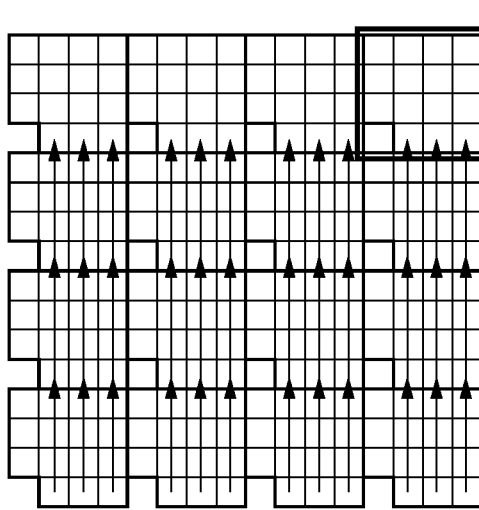

FIG. 15A to FIG. 15C are views showing (three) prediction directions of high-pass components. High-pass components here are the AC components excluding the DC components of 4×4 blocks obtained by the first frequency conversion in FIG. 6 (FIG. 6). One DC component and 15 AC components are obtained from one block that has undergone frequency conversion. In FIG. 15A to FIG. 15C, numbers 1 to 15 are assigned to indicate the positions of the AC components in the arrangement. Targets of high-pass component prediction are AC components {1, 2, 3} or AC components {4, 8, 12} in FIG. 15A. For example, when it is determined to obtain prediction errors of the AC components {1, 2, 3}, the AC components {4, 5, 6, . . . , 15} are excluded from the prediction error calculation processing targets.

Figure 16:
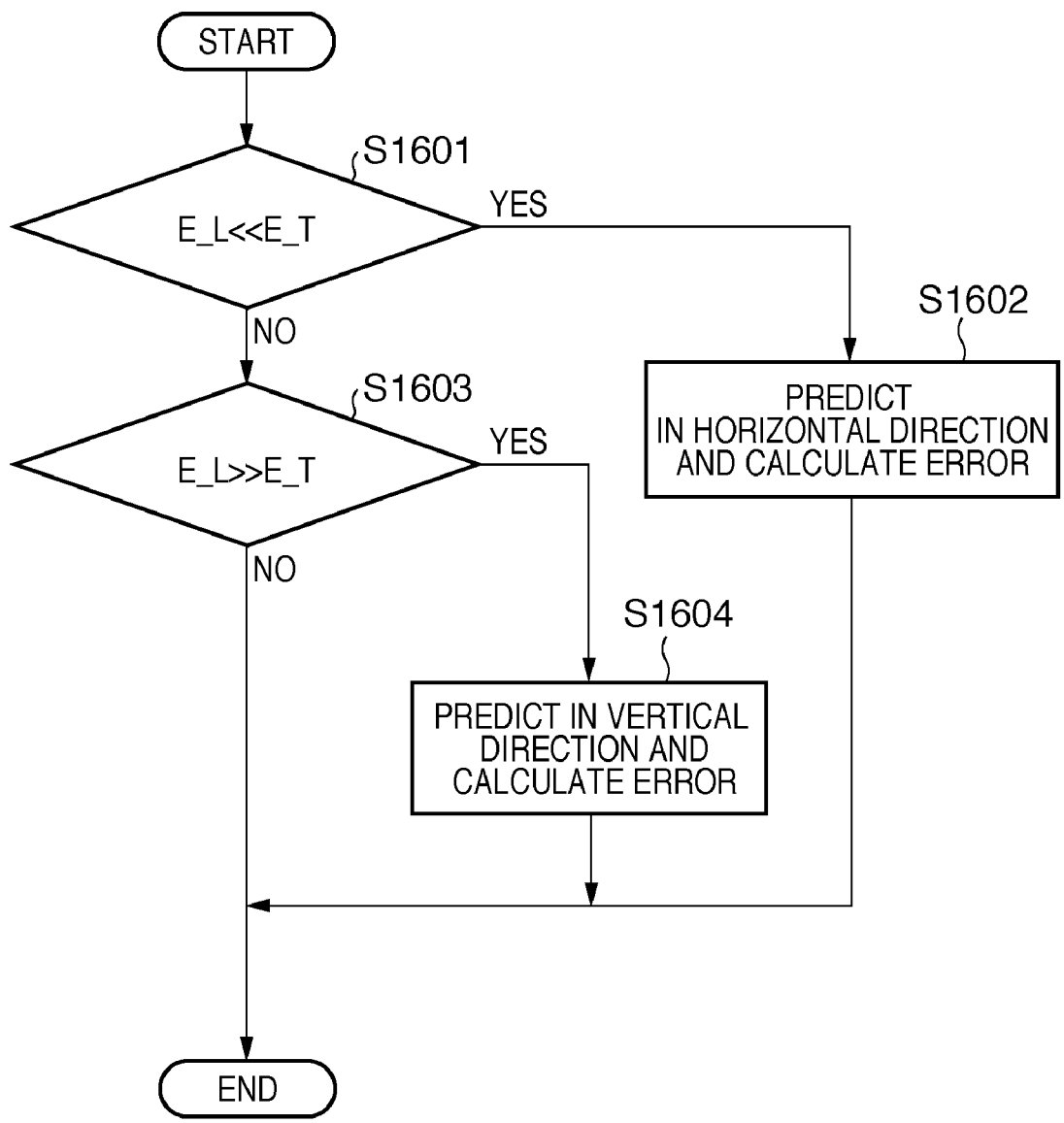
FIG. 16 is a flowchart illustrating the processing procedure of high-pass component prediction processing.

FIG. 16 is a flowchart illustrating high-pass component prediction processing of the coefficient prediction unit 104. The processing will be described below with reference to the flowchart.

An energy value E_L of the ACDC components at the positions {4, 8, 12} of blocks on the left edge of the tile of interest and an energy value E_T of the ACDC components at the positions {1, 2, 3} of blocks on the upper edge of the tile of interest are obtained. The tile of interest includes 4×4 blocks. The value E_L is the sum of the absolute values of the ACDC components at the positions {4, 8, 12} of the 16 blocks. The value E_T is the sum of the absolute values of the ACDC components at the positions {1, 2, 3} of the 16 blocks.

In step S1601, the coefficient prediction unit 104 determines whether E_L is sufficiently smaller than E_T. The coefficient prediction unit 104 determines whether $$E\_L - E\_T < Th$$

is satisfied, where Th is a preset positive threshold.

Upon determining that E_L<<E_T, the coefficient prediction unit 104 determines the horizontal direction as the direction of obtaining the prediction errors of the AC components of the block of interest. In step S1602, the coefficient prediction unit 104 scans the AC components at the positions {4, 8, 12} of the blocks in the horizontal direction shown in FIG. 15A, thereby obtaining prediction errors.

If NO in step S1601, the coefficient prediction unit 104 advances to the process to step S1603 to determine whether E_T is sufficiently smaller than E_L. Using the above threshold Th, the coefficient prediction unit 104 determines whether $$E\_T - E\_L < Th$$

is satisfied.

Upon determining in step S1603 that E_T<<E_L, the coefficient prediction unit 104 determines the vertical direction as the direction of obtaining the prediction errors of the AC components of the block of interest. In step S1604, the coefficient prediction unit 104 scans the AC components at the positions {1, 2, 3} of the blocks in the vertical direction shown in FIG. 15B, thereby obtaining prediction errors.

If NO in step S1603, the coefficient prediction unit 104 does not perform prediction error calculation for the AC components in the macro block of interest.

In the embodiment, one tile includes 6×4 macro blocks. Hence, the header of finally output encoded data of each tile stores information representing "horizontal", "vertical", or "no scan" as the scanning direction of each macro block.

The processing of the coefficient prediction unit 104 has been described above. As the result of prediction processing of the coefficient prediction unit 104, the prediction errors of the DC components, ACDC components, and AC components and a plurality of component values that have not undergone prediction error calculation are output to the coefficient scanning unit 105.

The coefficient scanning unit 105 includes a buffer to store the above-described information of one tile. The coefficient scanning unit 105 zigzag-scans the components (the prediction errors and the components that have not undergone prediction error calculation), like coefficient scanning of JPEG, and rearranges them in the buffer. References that disclose HD Photo or the specifications of HD Photo give more information on details of this processing, and a detailed description thereof will be omitted here.

The entropy encoding unit 106 entropy-encodes the values arranged in the internal buffer of the coefficient scanning unit 105 (assigns Huffman code words).

In the embodiment, as for DC components, the difference between adjacent blocks is calculated and Huffman-coded. As for low-pass components and high-pass components, two-dimensional Huffman coding is performed for each combination of a zero-run coefficient and a non-zero coefficient in accordance with the zigzag-scanning order. The two-dimensional Huffman coding is executed using the same technique as JPEG.

When entropy encoding of one tile has finished, the code stream generating unit 107 rearranges encoded data as the result of entropy encoding, and generates a code stream with a header added to the top.

In the embodiment, there are two arrangement modes of the code stream of one tile. One is a spatial mode (spatial order code stream), and the other is a frequency mode (resolution order code stream).

Figure 17:
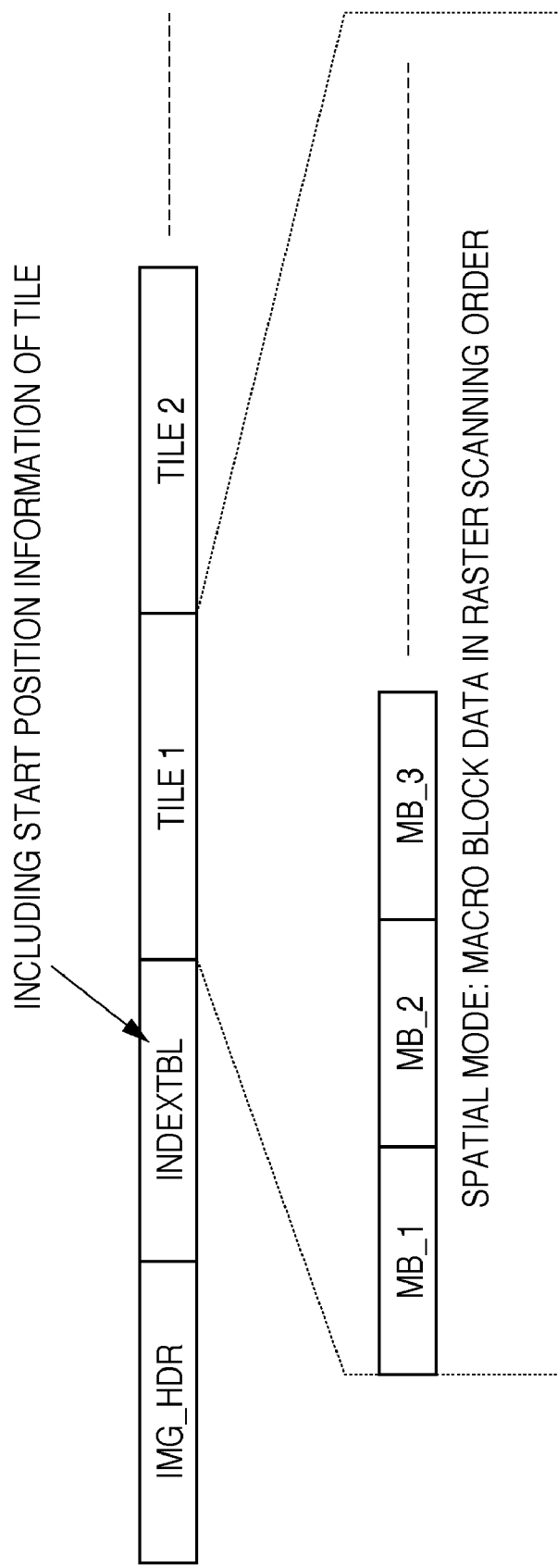
FIG. 17 is a view showing the data structure of encoded data in a spatial mode.

In the spatial mode, data of macro blocks in a tile are arranged in the raster scanning order, as shown in FIG. 17. One macro block data contains encoded data of DC components, those of ACDC components, and those of AC components in this order.

Figure 18:
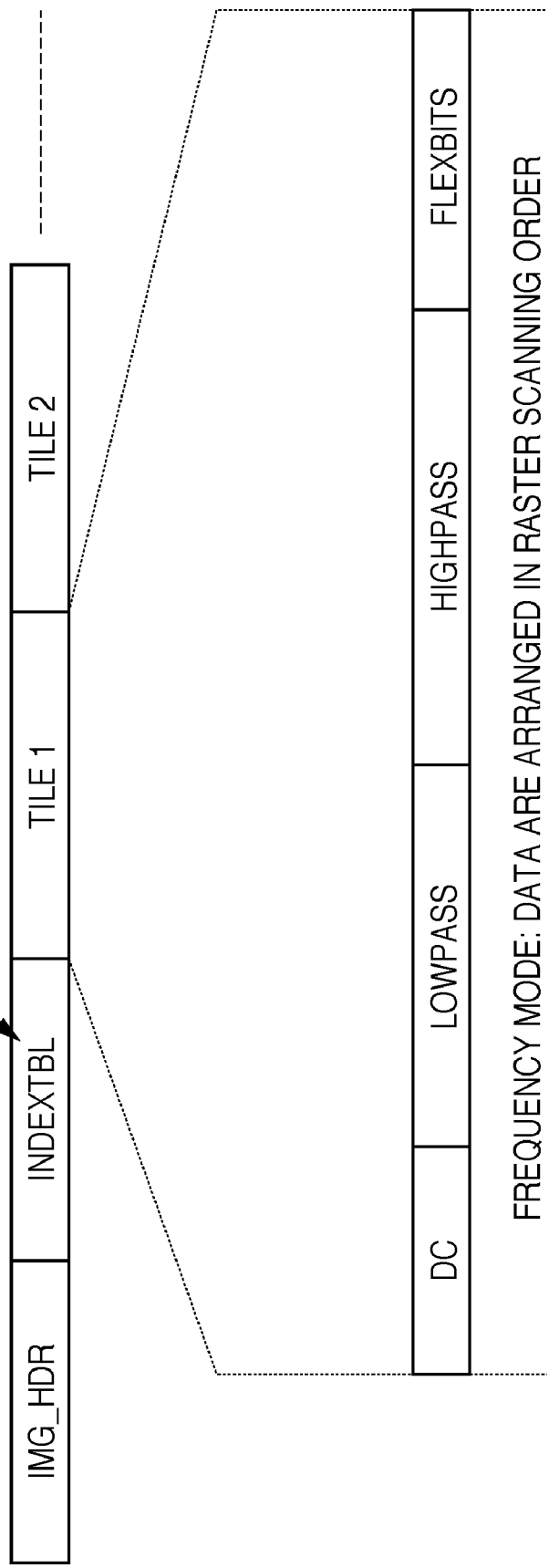
FIG. 18 is a view showing the data structure of encoded data in a frequency mode.

In the frequency mode, encoded data of DC components in a tile are arranged first, those of ACDC components are arranged next, and those of AC components are arranged at last, as shown in FIG. 18. That is, encoded data are arranged from a low frequency to a high frequency.

The format in the spatial mode is convenient for reproducing an original image from the beginning. On the other hand, the latter frequency mode is convenient for reproducing an image having a resolution (intermediate resolution) lower than that of an original image. That is, the frequency mode is suitable for reproducing an image while gradually raising its resolution.

"FLEXBITS" in encoded data of the frequency mode shown in FIG. 18 will briefly be explained. In encoded data of HD Photo, each of component values (including prediction error values) is divided into an upper bit group and a lower bit group at a predetermined bit position of multiple bits representing the component value. The upper bit group continuously includes the same value at a high probability and therefore undergoes encoding. The values in the lower bit group have no continuity, so no encoding is performed. FLEXBITS includes unencoded data of the lower bits of each of component values (including prediction error values).

In this embodiment, if the above-described code stream forming information CF is "2", the code stream generating unit 107 generates a code stream by arranging encoded data in an order according to the frequency mode. If the code stream forming information CF is "1", the code stream generating unit 107 generates a code stream in the spatial mode. Plainly speaking, when encoding an image having a high resolution (in the embodiment, the size is L or more), the image has an enormous number of pixels, and the user generally views (decodes) an image having a lower resolution at a high probability. Hence, a code stream is generated in the frequency mode. If the size is smaller than L, a code stream is formed in the spatial mode.

In the embodiment, the frequency mode or spatial mode is determined by determining whether the size is L or less. The determination may be done based on whether the size is M or less. In particular, recent digital cameras are steadily increasing the number of effective pixels, and the number of selectable image sizes is expected to increase from three to four or more. Hence, the user may set the size (number of pixels) as the threshold. In either case, setting information representing a minimum resolution for the spatial mode is held in a non-volatile memory, and a code stream is formed based on the held information.

Those skilled in the art can easily understand that code stream generation in the spatial mode is relatively simple processing because a code stream can be formed for each macro block. On the other hand, processing in the frequency mode takes a longer time because a code stream can be formed only after the entire tile has been encoded. However, the latter method allows display of a reduced image at the initial stage of decoding/reproduction. It is therefore possible to heighten the value of the application.

Since the frequency mode or spatial mode is uniquely determined for one image, a file header stores information representing which mode is selected. The file header also stores information about the encoding method, such as a QP, prediction method, Huffman coding table, and code stream forming method. A tile header stores information representing the scanning direction in AC component prediction processing.

As described above, according to the first embodiment, the larger the size of a captured image is, the more the stream conversion unit 102 executes block overlap processing (twice at maximum). This prevents an image reproduced at an intermediate resolution from including noticeable block noise, and enables to reproduce a high-quality image.

If the size of a captured image is L or more, a generated code stream has a data structure in the frequency mode. This makes it possible to decode an image at an intermediate resolution lower than the original resolution while skipping data except decoding targets, and speed up the decoding processing of the image having the intermediate resolution.

In the embodiment, encoding target image data includes a plurality of tiles. However, encoding target image data may be one tile. This also applies to the embodiments to be described below.

Second Embodiment

Figure 27:
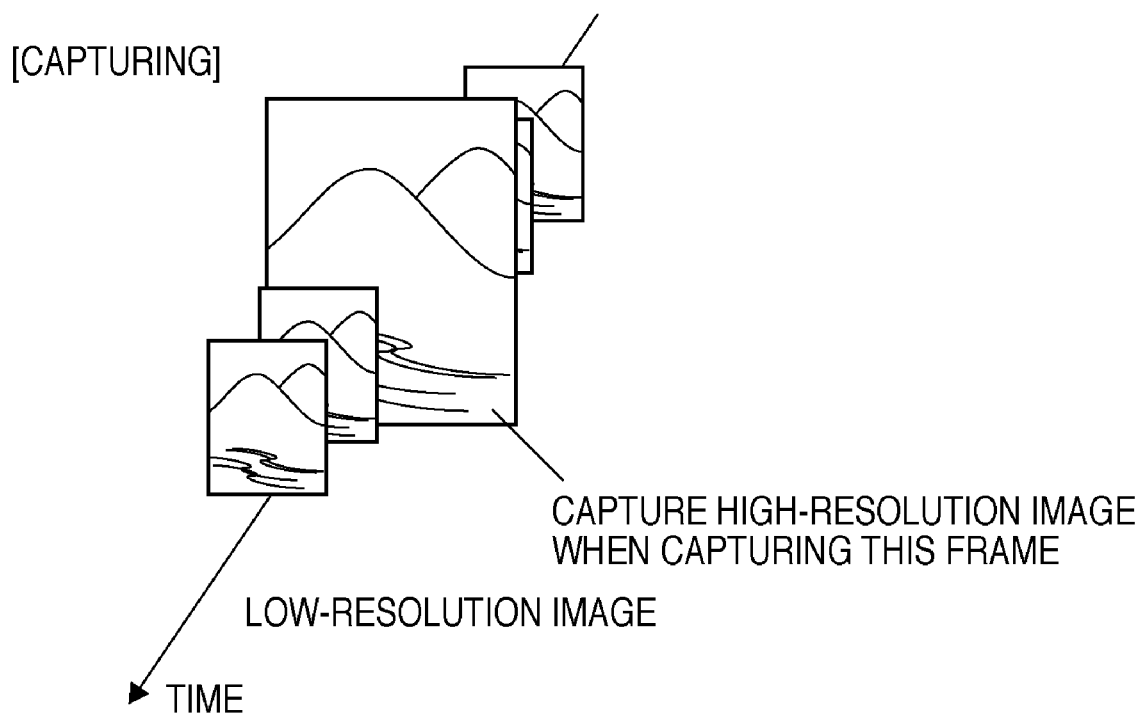
FIG. 27 is a view showing the frame size relationship between a moving image and a still image when capturing a still image during moving image capturing according to the second embodiment.

In the first embodiment, an example of application to a digital camera has been described. However, the present invention is not limited to a digital camera. In the second embodiment, an example of application to a digital camcorder will be explained. The camcorder allows a user to capture a high-resolution still image during time series image capturing (moving image capturing), as shown in FIG. 27. To effectively use a storage medium, a still image is reduced (resolution-down processing) to the frame size of a moving image. The reduced still image is used as a frame image for a moving image at the capturing timing. The image quality of an intermediate resolution image obtained by the reduction processing is preferably high, needless to say.

Figure 23:
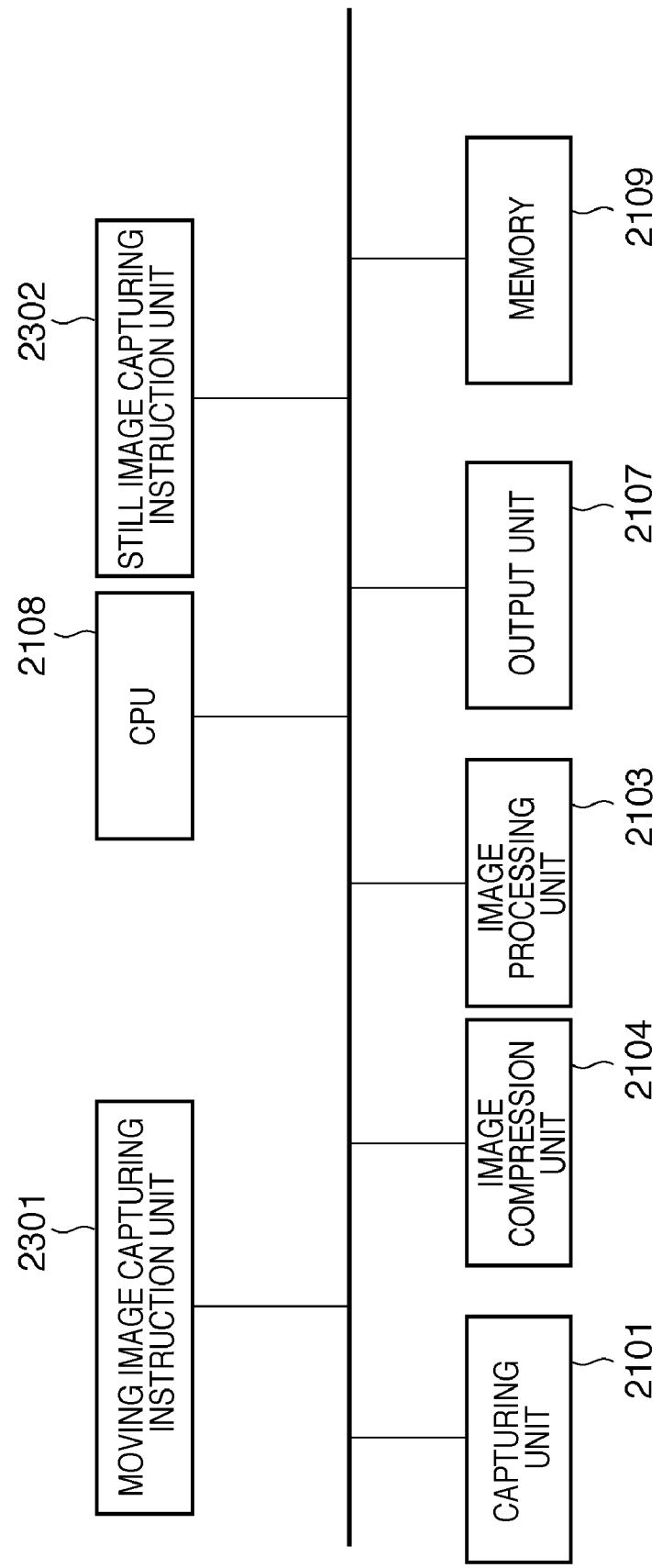
FIG. 23 is a block diagram showing the arrangement of a digital video camera according to the second embodiment.

FIG. 23 is a block diagram showing the arrangement of a digital video camera according to the second embodiment.

The same reference numerals as in FIG. 21 denote parts having the same functions in FIG. 23. The arrangement in FIG. 23 is different in that it includes a moving image capturing instruction unit 2301 and a still image capturing instruction unit 2302 in place of the size designation unit 2105 and the capturing instruction unit 2102 in FIG. 21. A capturing unit 2101 includes an image sensing element capable of capturing an image at a resolution of 4000 horizontal pixels× 3000 vertical pixels. A moving image is captured at a resolution of about 640×480 pixels. A still image is captured at a high resolution of 400×3000 pixels.

The camcorder of the second embodiment enables still image capturing via the still image capturing instruction unit 2302 while a user is giving the instruction for moving image capturing via the moving image capturing instruction unit 2301.

Figure 24:
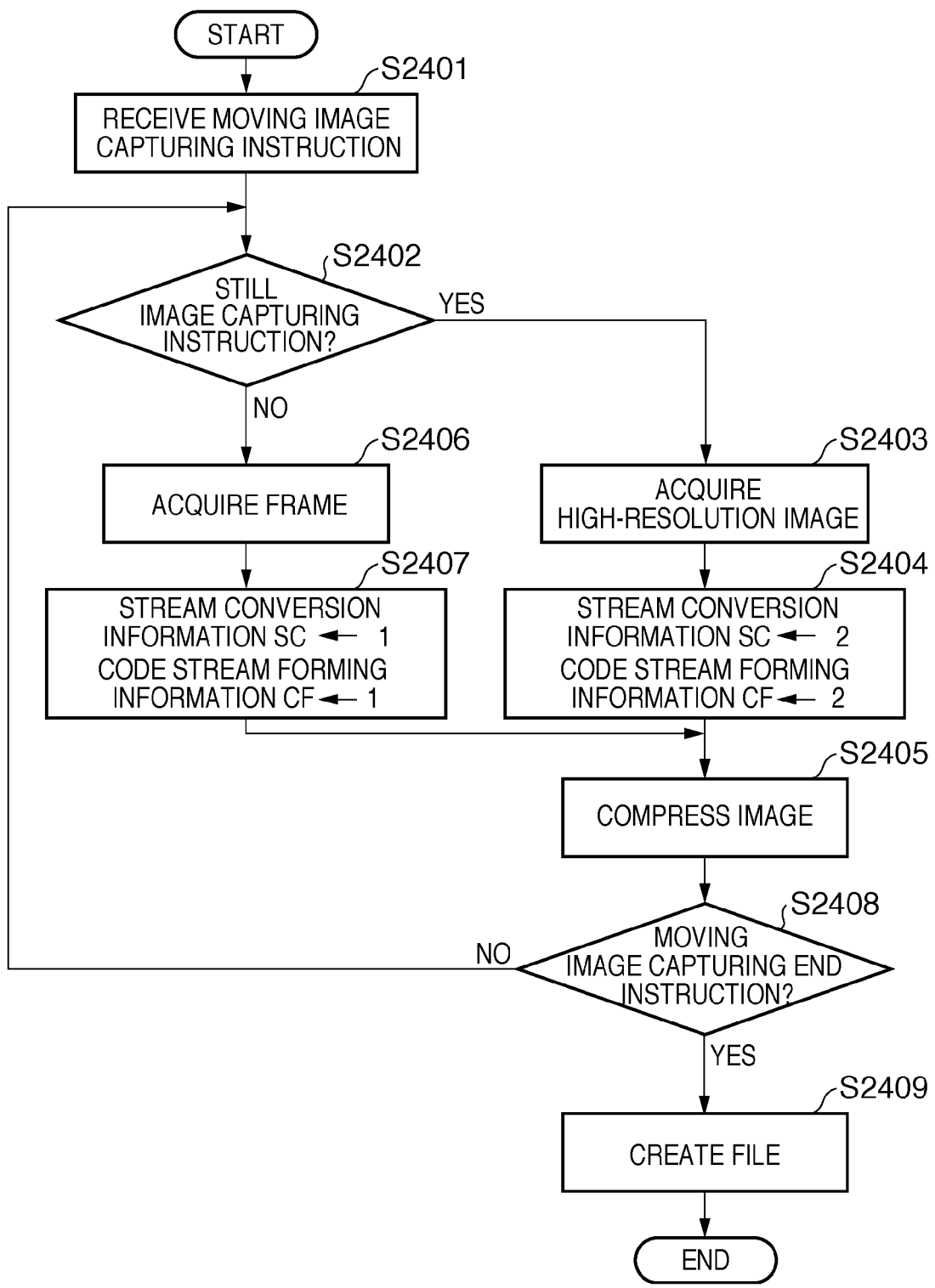
FIG. 24 is a flowchart illustrating the processing procedure of capturing processing according to the second embodiment.

The flowchart in FIG. 24 illustrates the processing procedure of a CPU 2108 when a user instructs the moving image capturing instruction unit 2301 to capture and record a moving image.

Upon receiving a moving image capturing instruction from the user (step S2401), the CPU 2108 confirms the presence/ absence of a still image capturing instruction (step S2402). In other words, the CPU 2108 determines whether the user has given an instruction to capture a high-resolution image. If a still image capturing instruction is received, the CPU 2108 advances the process to step S2403 to acquire a high-resolution still image from the capturing unit 2101 and store it in a memory 2109. In step S2404, the CPU 2108 instructs an image processing unit 2103 to perform predetermined image processing, and sets "2" in each of two pieces of information, i.e., parameter stream conversion information SC and code stream forming information CF to be given to an image compression unit 2104. In step S2405, the CPU 2108 causes the image compression unit 2104 to start compression-coding processing. As a result, encoded data of high-resolution image data is stored in the memory 2109.

At this time, an image having a low resolution equal to that of the frame of a moving image is decoded from the generated encoded data. The decoded image is stored in the memory 2109 as one frame of the moving image.

Upon determining in step S2402 that no still image capturing instruction is received, the CPU 2108 advances the process to step S2406 to acquire image data at the resolution of a moving image frame from the capturing unit 2101 and store it in the memory 2109. The CPU 2108 instructs the image processing unit 2103 to perform predetermined image processing, and sets "1" in each of the stream conversion information and the code stream forming information as information about the image compression method (step S2407). The CPU 2108 causes the image compression unit 2104 to execute compression processing (step S2405).

In step S2408, the CPU 2108 determines whether the user has input a moving image capturing end instruction. If no end instruction has been input, the CPU 2108 returns the process to step S2402 to repeat the above-described processing. If a moving image capturing end instruction has been input, the CPU 2108 advances the process to step S2409. In step S2409, the CPU 2108 concatenates the frames of the moving image stored in the memory 2109, and stores it in a memory card connected to an output unit 2107 as a moving image file. If encoded data of a high-resolution still image exists in the memory 2109, the CPU 2108 stores it in the memory card as a still image file. The processing of the image compression unit 2104 is the same as in the first embodiment, and a description thereof will not be repeated.

As described above, the camcorder of the second embodiment can use, as a frame of a moving image, an intermediate resolution image of a still image captured during moving image capturing. Additionally, to obtain high image quality in the moving image sequence, quality improving processing is performed for the intermediate resolution image.

Third Embodiment

The third embodiment will be described. In the first and second embodiments, encoding target image data is an image captured by the capturing unit 2101. An example will be described in the third embodiment, in which an application program executed on an information processing apparatus (to be referred to as a PC hereinafter) represented by a personal computer compression-codes an image.

An OS (Operating System) executed on a recent PC can copy data handled by various kinds of applications to a virtual memory (temporary save memory called a clipboard) and paste it onto another application (the function is generally called "copy & paste").

Document and image editing applications executable on the OS also use or can use the function. Examples of such applications are MS-Word® and Photoshop®. More specifically, while an application is editing each page, an image displayed by another application or viewer can be copied and pasted to a given page.

In the third embodiment, when information stored on the clipboard is image data, and an instruction to insert (paste) the image data is input, the page size managed by the application is compared with the size of the image data. If the image size is equal to or smaller than the page size, an image in the spatial mode is pasted. If the image size is larger than the page size, an image in the frequency mode is pasted.

Figure 25:
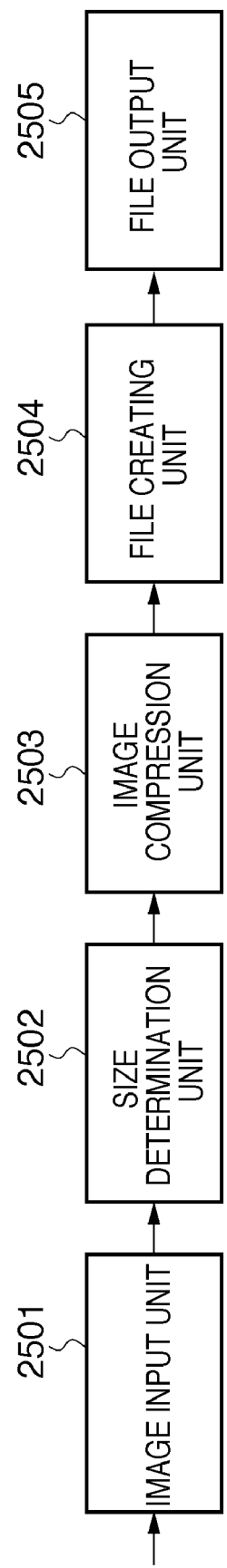
FIG. 25 is a conceptual view showing the sequence of processing of an application program to be executed by an information processing apparatus according to the third embodiment.

An application program (document processing application) according to the third embodiment has an arrangement shown in FIG. 25. As shown in FIG. 25, the application program includes an image input unit 2501, size determination unit 2502, image compression unit 2503, file creating unit 2504, and file output unit 2505. Each processing unit is implemented by a function or a subroutine executed by a CPU in the information processing apparatus.

Figure 26:
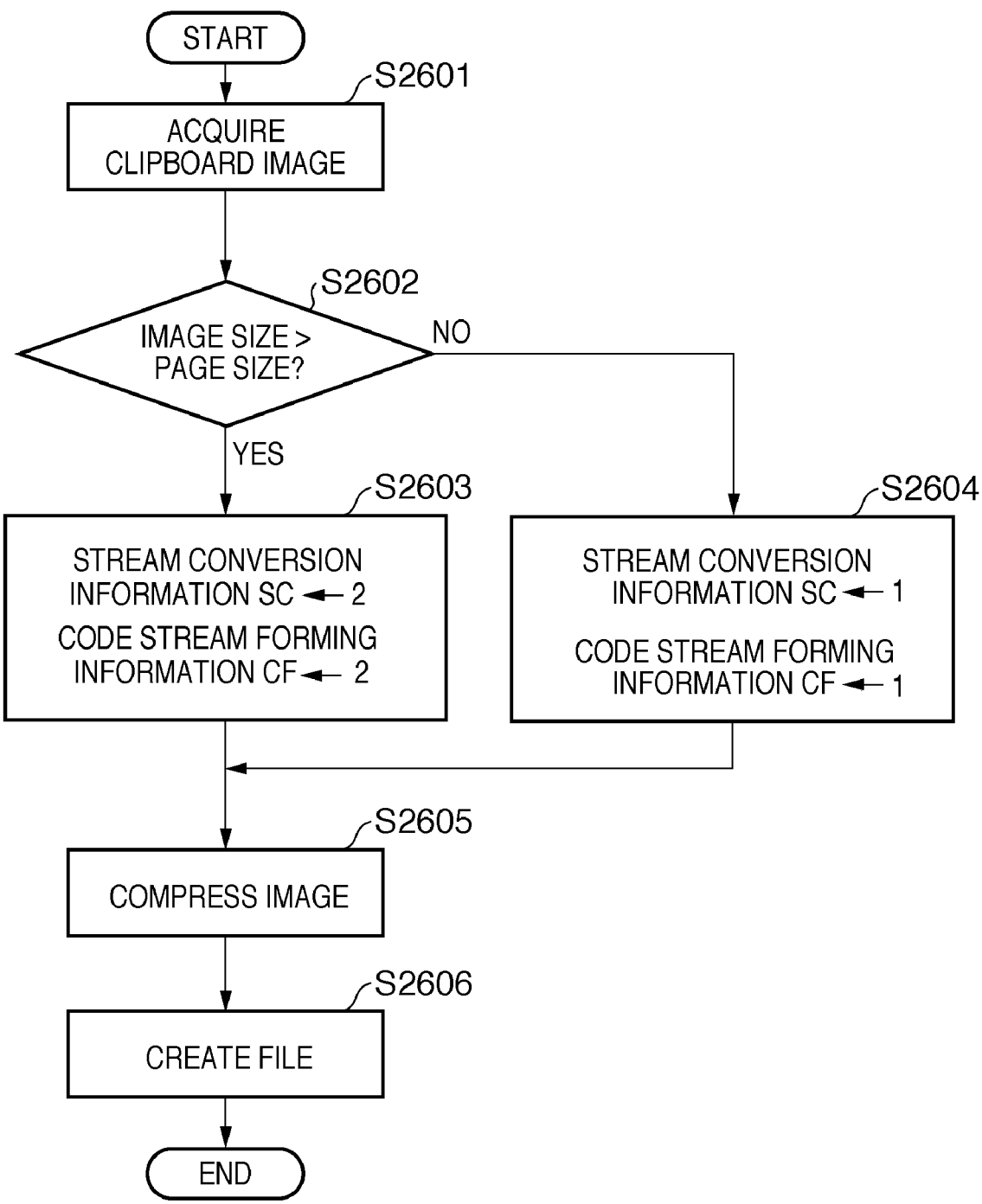
FIG. 26 is a flowchart illustrating a processing procedure according to the third embodiment.

The processing procedure of the arrangement in FIG. 25 will be described below with reference to the flowchart in FIG. 26.

When a user gives the instruction to execute the application, the application program is read out from the hard disk to the RAM. The CPU executes the application program. The processing of the CPU when executing the application will be explained below.

When an instruction to insert, into a page, an image stored on the clipboard is received via a user interface, the image input unit 2501 inputs the raster image on the clipboard (step S2601). Next, the size determination unit 2502 determines whether the size of the input image is larger than the page size of the document (step S2602).

Upon determining that the size of the image to be inserted is larger than the page size of the document (YES in step S2602), the CPU determines "2" as the value of stream conversion information SC and code stream forming information CF as information about the image compression method (step S2603). The CPU sets the determined stream conversion information SC and code stream forming information CF in the image compression unit 2503 as parameters, and causes it to execute compression-coding processing.

If the size of the image to be inserted is equal to or smaller than the page size of the document (NO in step S2602), the CPU determines "1" as the value of the stream conversion information SC and code stream forming information CF as information about the image compression method (step S2604). The CPU sets the determined stream conversion information SC and code stream forming information CF in the image compression unit 2503 as parameters, and causes it to execute compression-coding processing.

The image compression unit 2503 executes the same processing as in the above-described first embodiment in accordance with a computer program (step S2605). The file creating unit 2504 inserts generated encoded data into the target page as an image encoded data file (step S2606). Note that the generated image encoded data file may be stored in the hard disk. The image encoded data or input text information may be output to the file output unit 2505 as a file.

As described above, according to the third embodiment, the image quality is raised assuming use of an intermediate resolution image if the size of an image to be inserted is larger than the page size of a document.

In the third embodiment, the image is inserted into a given page of the application via the clipboard. Alternatively, the application may display a dialogue box and execute the processing when the user selects the image to be inserted into the page.

In many cases, an image to be inserted is larger than the page size of a document. Hence, the user may set one of a mode to compare the size of an image to be inserted with the size of an edited page and a mode not to do so. The set information is separately stored in a storage device such as a hard disk drive. If the mode "not to perform comparison" is set, block overlap processing may be executed twice unconditionally.

Fourth Embodiment

In the first to third embodiments, the stream conversion information SC and code stream forming information CF are set depending on the image size. An example will be described in the fourth embodiment, in which stream conversion information SC and code stream forming information CF are set in accordance with the output destination of a captured image.

Figure 28:
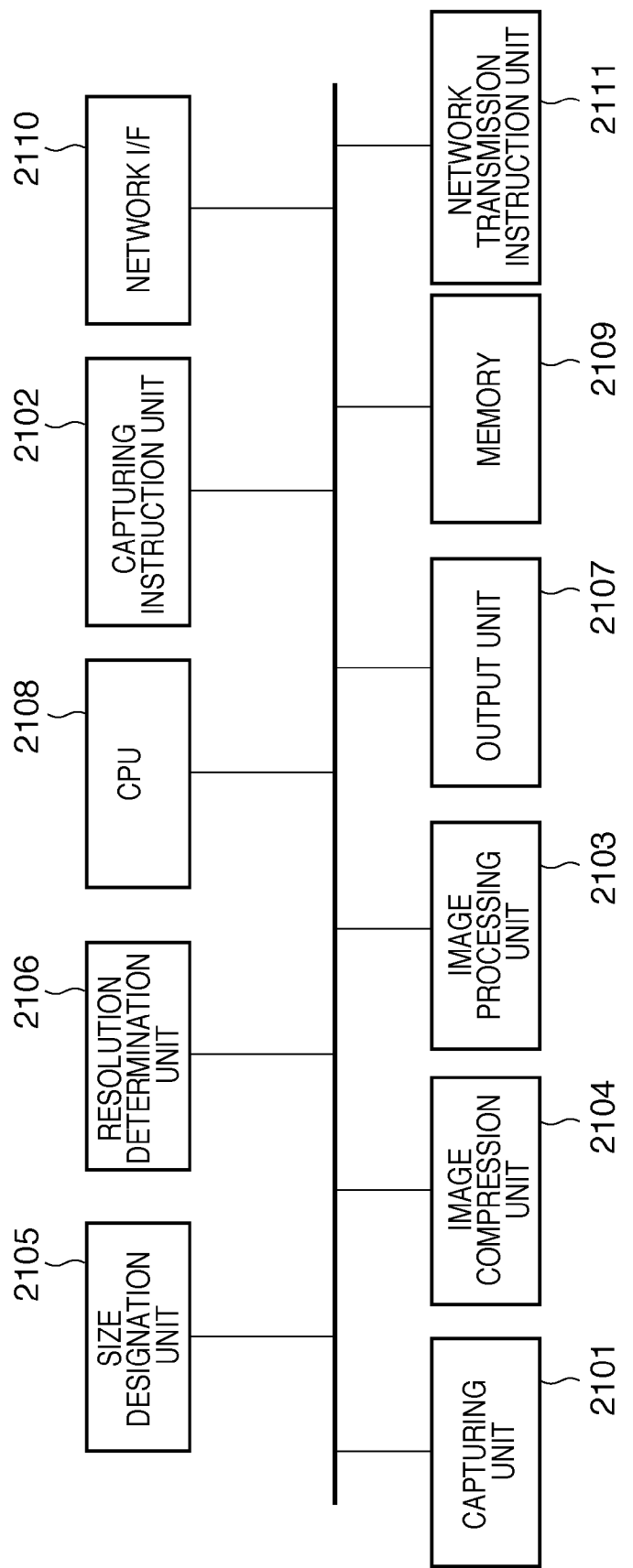
FIG. 28 is a block diagram showing the arrangement of a digital camera according to the fourth embodiment.

FIG. 28 is a block diagram showing the arrangement of a digital camera according to the fourth embodiment. It is different from FIG. 21 of the first embodiment in that a network interface 2110 (wireless LAN interface) and a network transmission instruction unit 2111 are added. The remaining components are the same as in the first embodiment, and a description thereof will not be repeated.

When a user sets ON/OFF of network transmission by operating the network transmission instruction unit 2111, a CPU 2108 causes a memory 2109 to store and hold the setting information. When the network transmission is ON, a captured image (compression-coded image data) is transmitted to another preset device (e.g., PC) via the network interface 2110. When the network transmission is OFF, encoded image data is stored in a memory card connected to an output unit 2107. That is, the network transmission instruction unit 2111 functions as a designation unit which designates the encoded data storage destination.

When the user sets the resolution (one of sizes L, M, and S, as in the first embodiment) of a captured image by operating a size designation unit 2105, the CPU 2108 causes the memory 2109 to store and hold the set size information too.

Figure 29:
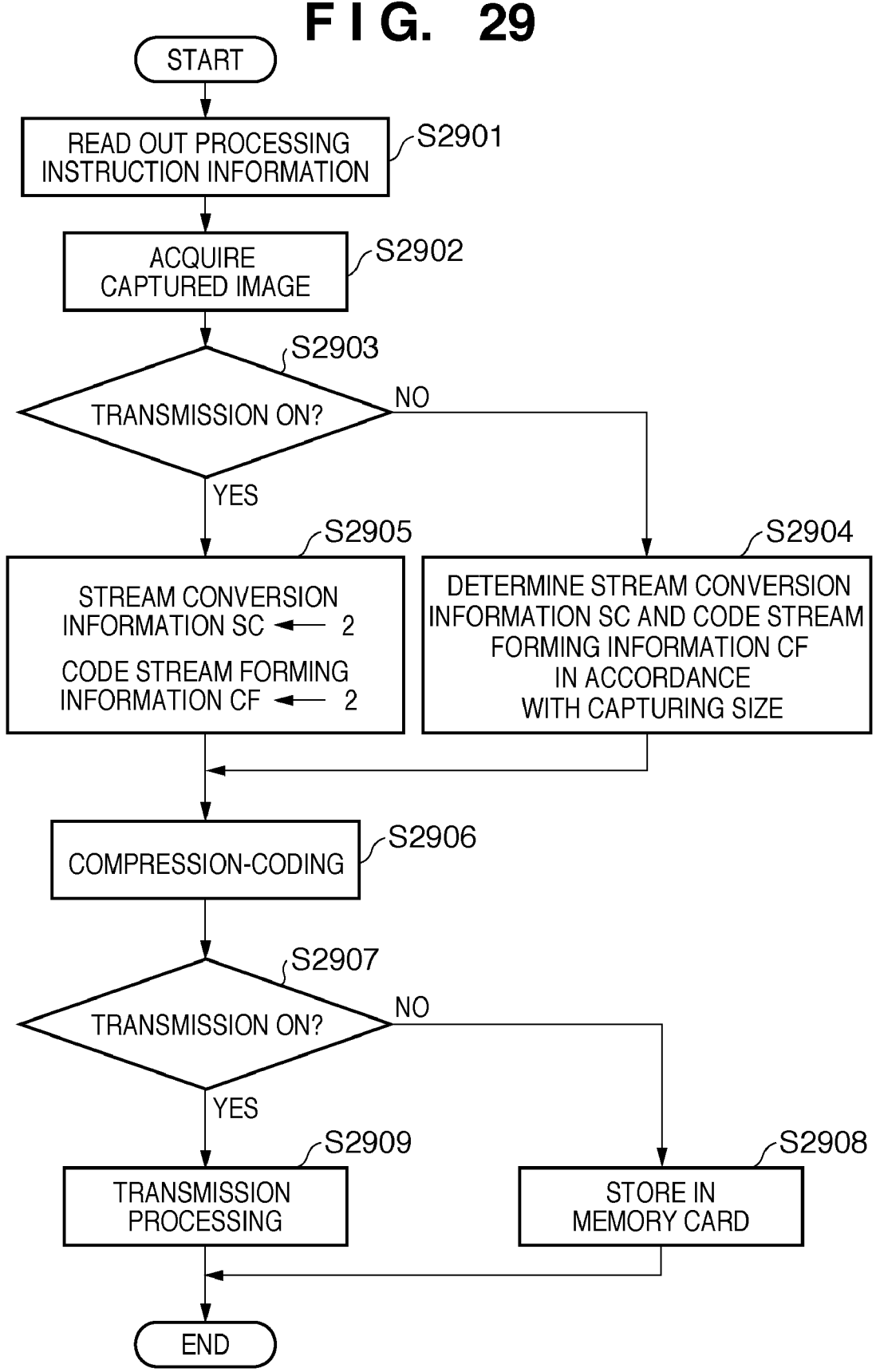
FIG. 29 is a flowchart illustrating the processing procedure of image capturing according to the fourth embodiment.

The processing procedure of the CPU 2108 when the user has operated a shutter button in a capturing instruction unit 2102 will be described below with reference to the flowchart in FIG. 29.

When the shutter button is operated, the CPU 2108 reads out processing instruction information (information representing ON/OFF of transmission and size information) from the memory 2109 in step S2901. In step S2902, the CPU 2108 acquires image data complying with the size information by driving a capturing unit 2101 and temporarily stores it in the memory 2109.

In step S2903, the CPU 2108 determines based on the processing instruction information whether transmission is ON. If transmission is OFF, that is, setting is done to store a captured image in the memory card, the process advances to step S2904 to determine the value of the stream conversion information SC and code stream forming information CF in accordance with the size information. The values of the stream conversion information SC and code stream forming information CF are determined in accordance with the same procedure as in the first embodiment. The determined stream conversion information SC and code stream forming information CF are set in an image compression unit 2104.

If it is determined that transmission is ON, the process advances to step S2905. The CPU 2108 determines "2" as the value of both the stream conversion information SC and the code stream forming information CF independently of the image size, and sets them in the image compression unit 2104.

When the stream conversion information SC and code stream forming information CF are set in one of steps S2904 and S2905, the process advances to step S2906. The CPU 2108 causes the image compression unit 2104 to execute compression-coding processing. The encoding processing of the image compression unit 2104 is the same as in the first embodiment, and a description thereof will not be repeated. Encoded image data generated by the image compression unit 2104 is stored in the memory 2109.

Next, the CPU 2108 advances to step S2907 to determine whether transmission is ON. If it is determined that transmission is OFF, the process advances to step S2908. The encoded image data stored in the memory 2109 is stored in the memory card via the output unit 2107 as a file.

If it is determined in step S2907 that transmission is ON, the process advances to step S2909. The encoded image data stored in the memory 2109 is transmitted to a preset device (PC) via the network interface 2110.

As a result, when transmission is ON, the device (PC) to receive the encoded image data receives encoded data (FIG. 18) arranged in the order of resolution. Hence, the device can generate an image at a resolution lower than that of the display unit of the device by simple processing. To arrange encoded data in the order of resolution, block overlap processing is performed twice. It is therefore possible to suppress any degradation in image quality when an image having a resolution lower than the original resolution is reproduced.

Fifth Embodiment

Figure 30:
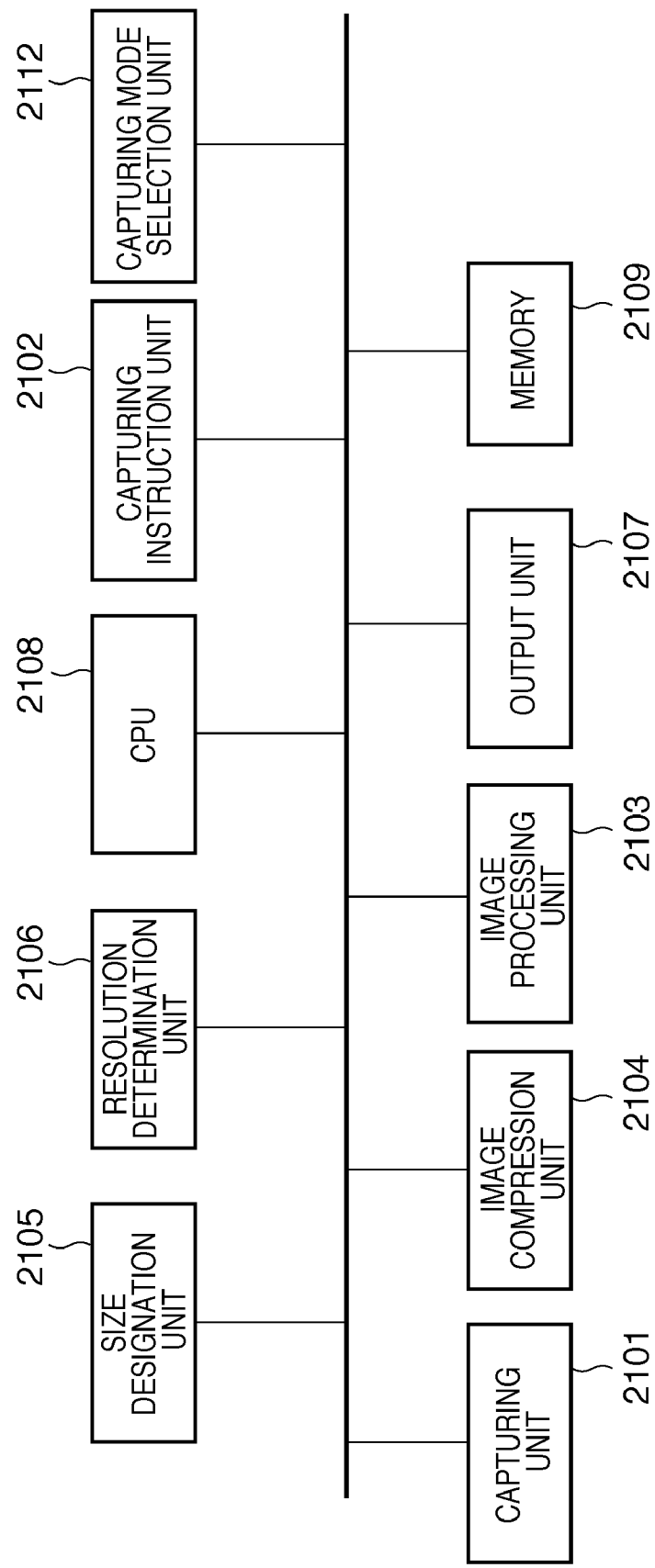
FIG. 30 is a block diagram showing the arrangement of a digital camera according to the fifth embodiment.

FIG. 30 is a block diagram showing the arrangement of a digital camera according to the fifth embodiment. It is different from FIG. 21 of the first embodiment in that a continuous shooting mode is provided in addition to normal capturing processing (single shooting mode), and a capturing mode selection unit 2112 to select one of the single shooting mode and the continuous shooting mode is added. The remaining components are the same as in the first embodiment, and a description thereof will not be repeated.

When a user sets a capturing mode via the capturing mode selection unit 2112, a CPU 2108 causes a memory 2109 to store and hold the setting information. When the user sets the resolution (one of sizes L, M, and S, as in the first embodiment) of a captured image by operating a size designation unit 2105, the CPU 2108 causes the memory 2109 to store and hold the set size information too.

Figure 31:
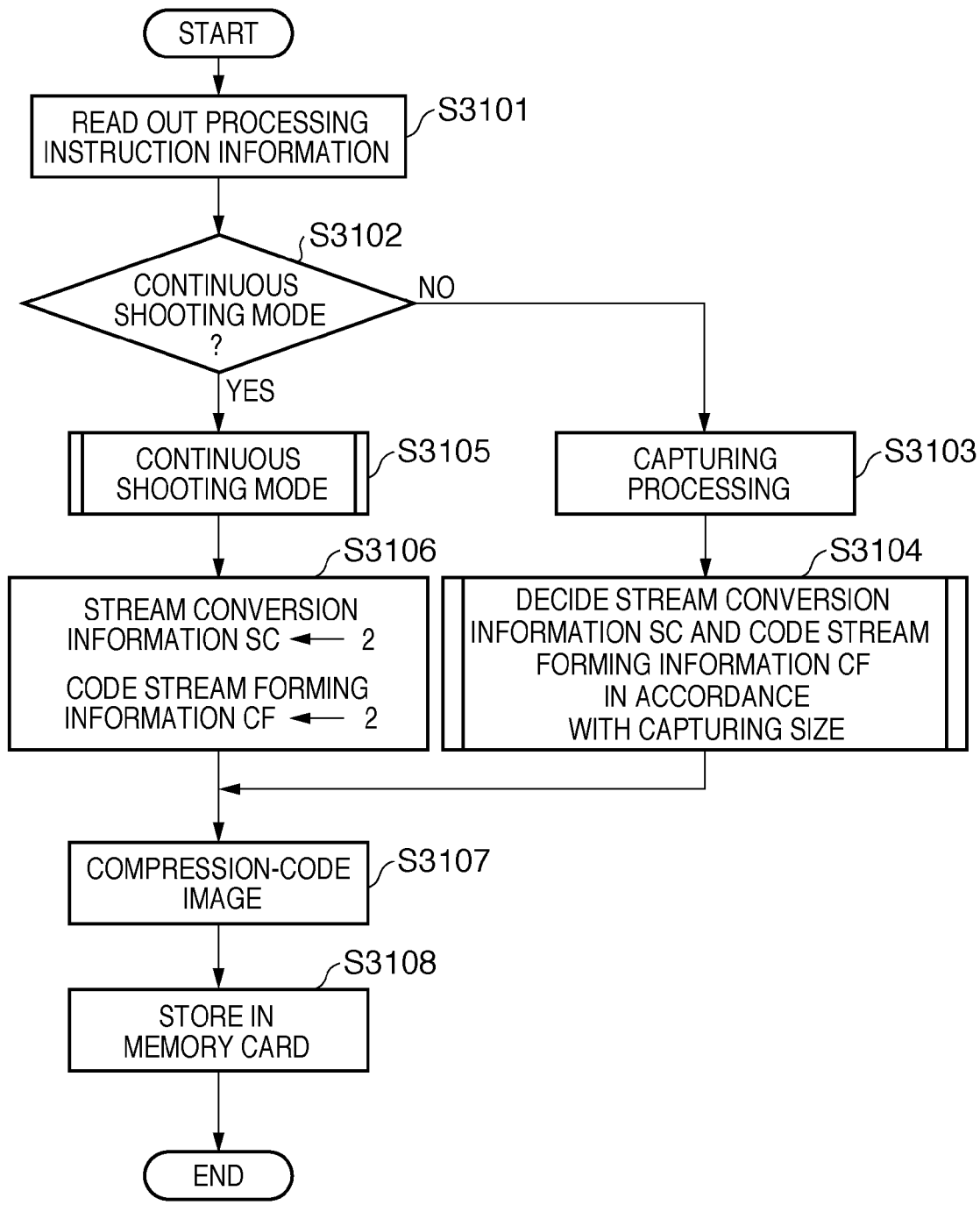
FIG. 31 is a flowchart illustrating the processing procedure of image capturing according to the fifth embodiment.

The processing procedure of the CPU 2108 upon capturing according to the fifth embodiment will be described below with reference to the flowchart in FIG. 31.

When the shutter button is operated, the CPU 2108 reads out processing instruction information (information representing the capturing mode and size information) from the memory 2109 in step S3101. In step S3102, the CPU 2108 determines whether the capturing mode is the continuous shooting mode.

If it is determined that the capturing mode is not the continuous shooting mode, i.e., the capturing mode is the single shooting mode, an image is captured, and image data complying with the set size information is stored in the memory 2109 in step S3103. In step S3104, the values of stream conversion information SC and code stream forming information CF are determined in accordance with the size information. The values of the stream conversion information SC and code stream forming information CF are determined in accordance with the same procedure as in the first embodiment. The determined stream conversion information SC and code stream forming information CF are set in an image compression unit 2104.

If it is determined that the capturing mode is the continuous shooting mode, the process advances to step S3105. In step S3105, the CPU 2108 repeats the set capturing processing and sequentially stores image data of the set size in the memory 2109 while the shutter button is being pressed. Hence, in the continuous shooting mode, the memory 2109 stores a plurality of image data.

When the shutter button transits to an unpressed state, or capturing processing of a preset number of images has ended, the CPU 2108 executes processing in step S3106. In step S3106, the CPU 2108 determines "2" as the value of both the stream conversion information SC and the code stream forming information CF independently of the image size, and sets them in the image compression unit 2104.

When the stream conversion information SC and code stream forming information CF are set in one of steps S3104 and S3106, the process advances to step S3107. The CPU 2108 causes the image compression unit 2104 to execute compression-coding processing. As a result, in the single shooting mode, compression-coding processing of one unencoded image data stored in the memory 2109 is executed, and the encoded image data is stored in the memory 2109. In the continuous shooting mode, compression-coding processing of a plurality of unencoded image data is executed, and the respective encoded image data are stored in the memory 2109.

Then, the process advances to step S3108. The one or plurality of encoded image data stored in the memory 2109 is stored in the memory card via an output unit 2107 as a file.

According to the above-described fifth embodiment, in the continuous shooting mode, both the stream conversion information SC and the code stream forming information CF are set to "2" independently of the image size.

This is because in the continuous shooting mode, a plurality of images are captured at a very short capturing time interval, and the user displays the images in order on the display screen of the PC at a high probability. Generally, the display unit of a PC has a resolution of 1600×1400 pixels at maximum. The minimum size (size S) of an image captured by the digital camera of this embodiment is 1600×1200 pixels. In this state, it is impossible to display the images in order. More specifically, independently of the original image size L, M, or S, a format to easily decode an image at a resolution much lower than that of the display unit is preferably employed. Hence, the code stream forming information CF is set to "2".

The stream conversion information SC is set to "2" to suppress any degradation in image quality when an image having a resolution lower than the original resolution is displayed.

Sixth Embodiment

The sixth embodiment will be described below. There is known a technique of separately compressing photos, backgrounds, and texts of a document and storing them in files. A typical file generated by this technique is a PDF file. There are various kinds of file formats nowadays, and converting a file (to be referred to as a mixed file hereinafter) containing pieces of information of different attributes can occur. In the sixth embodiment, an example of application to such mixed file conversion processing will be described.

A photo image in a mixed file is encoded data generated using some encoding technique. There are a number of encoding techniques, including JPEG 2000. JPEG 2000 can generate both encoded data in an arrangement with resolution scalability and encoded data in a spatial arrangement. If encoded image data generated by JPEG 2000 has a resolution scalable arrangement, it might be imagined that the creator of the mixed file intended to ensure resolution scalability of the image.

Encoded data generated by HD Photo described in the above embodiments can be decoded more simply at a higher speed as compared to encoded data generated by JPEG 2000.

In the sixth embodiment, if an existing mixed file includes encoded image data generated by JPEG 2000, and the encoded data has a resolution scalable arrangement, the JPEG 2000 encoded data is encoded using HD Photo encoding technique, thereby updating the mixed file. In the updating processing, the image data is re-encoded by setting both stream conversion information SC and code stream forming information CF to "2" so that an image having a resolution lower than the original resolution can efficiently be decoded without degradation in image quality at the time of the next access and display of the mixed file.

Figure 32:
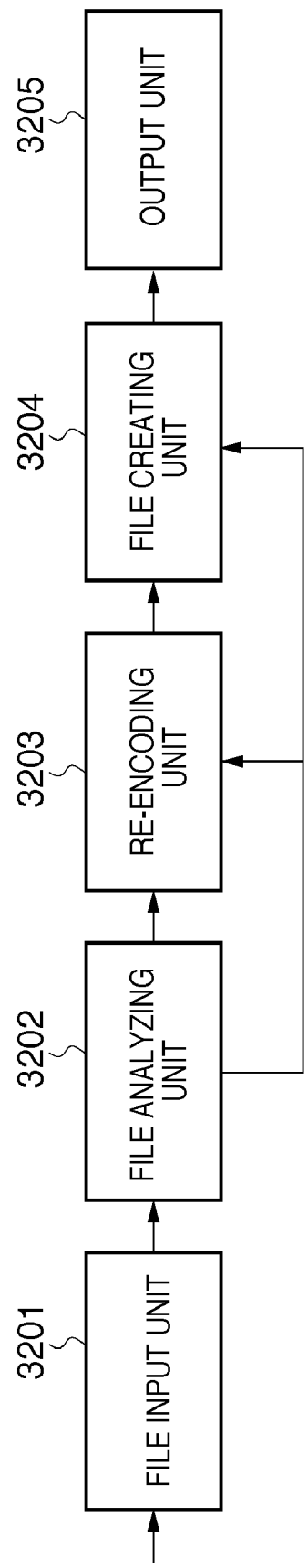
FIG. 32 is a conceptual view showing the sequence of processing of an application program to be executed by an information processing apparatus according to the sixth embodiment.
Figure 33:
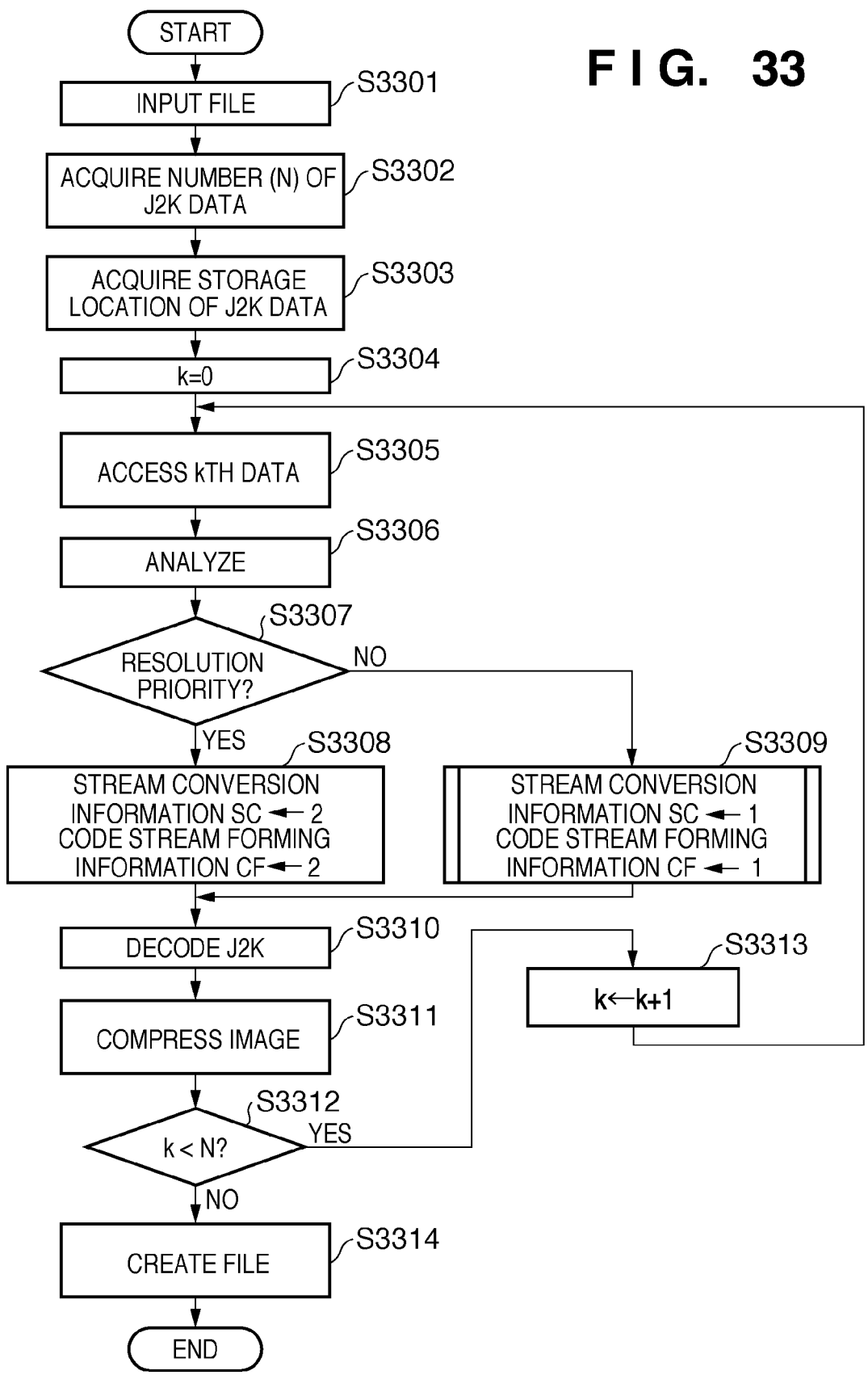
FIG. 33 is a flowchart illustrating a processing procedure according to the sixth embodiment.

An example will be described in the sixth embodiment, in which the present invention is applied to a general-purpose information processing apparatus such as a personal computer so that an application program executes the above processing. The hardware configuration of the information processing apparatus is needless to explain. FIG. 32 shows processing units (functions and subroutines in fact) of the application program according to the sixth embodiment. The contents of processing to be executed by a CPU will be described with reference to the flowchart in FIG. 33.

In the following explanation, assume that the mixed file to be processed is stored in the hard disk, and the updated file is overwritten to the same file name. The mixed file to be processed is designated by a user. This is merely an example. The mixed file to be processed may exist in a file server on a network, and the updated file may be stored in a local hard disk. That is, any input source and output source are usable.

First, in step S3301, a file input unit 3201 inputs a mixed file from the hard disk drive and outputs it to a file analyzing unit 3202. The file analyzing unit 3202 analyzes the header of the received mixed file and counts the number of JPEG 2000 encoded image data in the mixed file (step S3302). Let N be the number of JPEG 2000 encoded image data. Next, the storage location of each JPEG 2000 encoded image data in the mixed file is detected, and offset information from the file top is acquired (step S3303).

In step S3304, a counter (variable) k representing the number of JPEG 2000 files is reset to "0". In step S3305, kth JPEG 2000 encoded image data is acquired. In step S3306, the header of the JPEG 2000 encoded image data is analyzed to grasp the arrangement of the encoded data.

In step S3307, it is determined whether the encoded data has a resolution scalable arrangement. If it is determined that the encoded data has a resolution scalable arrangement (YES in step S3307), the process advances to step S3308 to set "2" to the stream conversion information SC and code stream forming information CF as information about the image compression method.

If it is determined that the encoded data has no resolution scalable arrangement (NO in step S3307), the process advances to step S3309 to set "1" to the stream conversion information SC and code stream forming information CF as information about the image compression method.

When the values of the stream conversion information SC and code stream forming information CF as the compression-coding parameters are thus determined, the process advances to step S3310.

In step S3310, the kth JPEG 2000 encoded image data is output to a re-encoding unit 3203. The re-encoding unit 3203 temporarily decodes the received JPEG 2000 encoded image data (step S3310), and then re-encodes it in accordance with the determined stream conversion information SC and code stream forming information CF (step S3311). The encoding processing is the same as in the first embodiment, and a detailed description thereof will be omitted. Note that the re-encoding result is temporarily stored in the main memory (RAM). If the RAM has no sufficient free space, the re-encoded image data may be stored in the hard disk as a temporary file.

When one JPEG 2000 encoded image data is re-encoded, it is determined whether the value of the counter k is smaller than the value N (step S3312). If k<N (YES in step S3312), the counter k is incremented by one in step S3313, and the process returns to step S3305.

If NO in step S3312, i.e., k=N, the process advances to step S3314. In step S3314, a file creating unit 3204 concatenates N encoded data obtain by re-compression-coding and data except the JPEG encoded data, thereby generating a mixed file. The generated mixed file is stored in the hard disk by the output unit 3205. Note that the new mixed file is created as one mixed file whose header stores information representing the location of each data in the file. When this operation has ended, the whole processing ends.

As described above, according to the sixth embodiment, in a mixed file including JPEG 2000 encoded data, the JPEG 2000 encoded image data can be converted into encoded data in a format for efficient decoding. It is therefore possible to generate an efficient mixed file that can be displayed in a shorter process time. If JPEG 2000 encoded data in the original mixed file has a resolution scalable arrangement, encoded data in the resolution scalable arrangement can be generated, as intended by the creator.

A method of putting data of the same frequency together in a tile has been disclosed as a frequency mode. However, the present invention is not limited to this. For example, data of the same frequency (same resolution) in all tiles of an image may be put together in a bit stream. In this case, encoded data are preferably arranged from a low frequency to a high frequency.

The first to sixth embodiments of the present invention have been described above. The first, second, fourth, and fifth embodiments may be implemented by a computer program which causes a computer to execute the processing corresponding to the embodiments, like the third and sixth embodiments. A computer program is normally stored in a computer-readable storage medium such as a CD-ROM. The computer program becomes executable when it is copied or installed in a system by setting the storage medium in the read unit (e.g., CD-ROM drive) of a computer. Hence, the computer-readable storage medium is also incorporated in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-096560, filed Apr. 2, 2008, which is hereby incorporated by reference herein in its entirety.

What is claimed is:

1. An image encoding apparatus which, defining a region including a plurality of pixels as a block, and a region including a plurality of blocks as a macro block, inputs image data including a plurality of macro blocks, generates encoded data of each macro block by processing the block as a minimum unit, and generates encoded data of the image data by arranging the encoded data of the macro blocks in a preset order, comprising:

an input unit which inputs the image data including the plurality of macro blocks;

a frequency conversion unit which frequency-converts each block to obtain one DC component data and a plurality of AC component data from each block;

a block overlap processing unit which filters data in a region across a boundary between adjacent blocks to suppress discontinuity of data at the boundary;

a setting unit which sets one of "0", "1", and "2" as an execution count of said block overlap processing unit based on a resolution of the image data of an encoding target;

a quantizing unit which quantizes each component data obtained by said frequency conversion unit;

an entropy encoding unit which entropy-encodes each component data after quantization by said quantizing unit; and a control unit which executes said frequency conversion unit twice, and executes said block overlap processing unit as many times as the count set by said setting unit, wherein when the execution count set by said setting unit is "0", said control unit (a) executes said frequency conversion unit a first time to frequency-convert each block in the macro block including the plurality of blocks, thereby calculating a plurality of DC component data of first level and a plurality of AC component data of first level, (b) executes said frequency conversion unit a second time to calculate one DC component data of second level and a plurality of AC component data of second level, while defining the plurality of DC component data of first level as a block, and executes the processes (a) and (b) for the image data including the plurality of macro blocks, when the execution count set by said setting unit is "1", said control unit (c) executes said block overlap processing unit to execute the block overlap processing for each block in the macro block including the plurality of blocks, (d) executes said frequency conversion unit a first time to frequency-convert each block in the macro block processed by said block overlap processing unit, thereby calculating a plurality of DC component data of first level and a plurality of AC component data of first level, (e) executes said frequency conversion unit a second time to calculate one DC component data of second level and a plurality of AC component data of second level, while setting the plurality of DC component data of first level as a frequency conversion target, and executes the process (c) to (e) for the image data including the plurality of macro blocks, and when the execution count set by said setting unit is "2", said control unit (f) executes said block overlap processing unit a first time to execute the block overlap processing for each block in the macro block including the plurality of blocks, (g) executes said frequency conversion unit a first time to frequency-convert each block in the macro block processed by said block overlap processing unit the first time, thereby calculating a plurality of DC component data of first level and a plurality of AC component data of first level, (h) executes said block overlap processing unit a second time to execute the block overlap processing for each block including the plurality of DC component data of first level in the image data including the plurality of macro blocks, the plurality of DC component data of first level being obtained by executing said frequency conversion unit of first level, and (i) executes said frequency conversion unit a second time to execute frequency conversion as many times as the number of blocks included in a set of the DC component data of first level obtained by said block overlap processing unit the second time.

2. The apparatus according to claim 1, wherein said input unit inputs, of the image data of the encoding target, image data in each region represented by a tile including the plurality of macro blocks.

3. The apparatus according to claim 1, wherein said setting unit sets a larger execution count of said block overlap processing unit as the resolution of the image data of the encoding target rises.

4. The apparatus according to claim 1, further comprising:
an image sensing unit;
a moving image capturing unit which captures time series image data by reducing a resolution of an image sensed by said image sensing unit to a preset resolution; and
a still image capturing unit which captures, as a still image, the image sensed by said image sensing unit,
wherein if a still image is captured by said still image capturing unit during moving image capturing by said moving image capturing unit, said setting unit sets the execution count of said block overlap processing unit to "2" for image data of the still image obtained by capturing, and said control unit executes said frequency conversion unit, said block overlap processing unit, said quantizing unit, and said entropy encoding unit in accordance with the setting by said setting unit, thereby generating a frame image having a resolution for a moving image at the time of still image capturing.

5. The apparatus according to claim 1, further comprising:
an editing unit which edits each page of a document; and
an insertion unit which inserts an image into a page that is being edited,
wherein if a size of the image to be inserted is larger than a size of the page, said setting unit sets the execution count of said block overlap processing unit to "2" for the image to be inserted.

6. The apparatus according to claim 1, further comprising:
an editing unit which edits each page of a document; and
an insertion unit which inserts an image into a page that is being edited,
wherein if said insertion unit is to insert the image into the page that is being edited by said editing unit, said setting unit sets the execution count of said block overlap processing unit to "2" for the image to be inserted.

7. A control method of an image encoding apparatus which, defining a region including a plurality of pixels as a block, and a region including a plurality of blocks as a macro block, inputs image data including a plurality of macro blocks, generates encoded data of each macro block by processing the block as a minimum step, and generates encoded data of the image data by arranging the encoded data of the macro blocks in a preset order, comprising steps of:

inputting the image data including the plurality of macro blocks;

frequency-converting each block to obtain one DC component data and a plurality of AC component data from each block;

performing block overlap processing to filter data in a region across a boundary between adjacent blocks to suppress discontinuity of data at the boundary;

setting one of "0", "1", and "2" as an execution count of the block overlap processing step based on a resolution of the image data of an encoding target;

quantizing each component data obtained in the frequency converting step;

entropy-encoding each component data after quantization in the quantizing step; and controlling to execute the frequency converting step twice, and execute the block overlap processing step as many times as the count set in the setting step, wherein in the control step, when the execution count set in the setting step is "0", (a) the frequency converting step is executed a first time to frequency-convert each block in the macro block including the plurality of blocks, thereby calculating a plurality of DC component data of first level and a plurality of AC component data of first level, (b) the frequency converting step is executed a second time to calculate one DC component data of second level and a plurality of AC component data of second level, while defining the plurality of DC component data of first level as a block, and the processes (a) and (b) are executed for the image data including the plurality of macro blocks, when the execution count set in the setting step is "1", (c) the block overlap processing step is executed to execute the block overlap processing for each block in the macro block including the plurality of blocks, (d) the frequency converting step is executed a first time to frequency-convert each block in the macro block processed in the block overlap processing step, thereby calculating a plurality of DC component data of first level and a plurality of AC component data of first level, (e) the frequency converting step is executed a second time to calculate one DC component data of second level and a plurality of AC component data of second level, while setting the plurality of DC component data of first level as a frequency conversion target, and the process (c) to (e) are executed for the image data including the plurality of macro blocks, and when the execution count set in the setting step is "2", (f) the block overlap processing step is executed a first time to execute the block overlap processing for each block in the macro block including the plurality of blocks, (g) the frequency converting step is executed a first time to frequency-convert each block in the macro block processed in the block overlap processing step executed the first time, thereby calculating a plurality of DC component data of first level and a plurality of AC component data of first level, (h) the block overlap processing step is executed a second time to execute the block overlap processing for each block including the plurality of DC component data of first level in the image data including the plurality of macro blocks, the plurality of DC component data of first level being obtained by executing the frequency converting step of first level, and (i) the frequency converting step is executed a second time to execute frequency conversion as many times as the number of blocks included in a set of the DC component data of first level obtained in the block overlap processing step executed the second time.

8. A non-transitory computer-readable storage medium retrievably storing a computer program causing a computer which reads out and executes the computer program to function as an image encoding apparatus of claim 1.

* * * * *